US012641399B2

(12) United States Patent　　(10) Patent No.:　US 12,641,399 B2
Cui et al.　　(45) Date of Patent:　May 26, 2026

(54) ELECTRONIC DEVICE AND METHOD IN A WIRELESS COMMUNICATION

(71) Applicant: Sony Group Corporation, Tokyo (JP)

(72) Inventors: Tao Cui, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 534 days.

(21) Appl. No.: 18/043,585

(22) PCT Filed: Sep. 9, 2021

(86) PCT No.: PCT/CN2021/117384

§ 371 (c)(1),
(2) Date: Mar. 1, 2023

(87) PCT Pub. No.: WO2022/052978

PCT Pub. Date: Mar. 17, 2022

(65) Prior Publication Data

US 2023/0319525 A1　　Oct. 5, 2023

(30) Foreign Application Priority Data

Sep. 9, 2020　(CN) .......................... 202010941158.4

(51) Int. Cl.
H04W 4/38　　(2018.01)
H04W 4/40　　(2018.01)
(52) U.S. Cl.
CPC .............. H04W 4/38 (2018.02); H04W 4/40 (2018.02)
(58) Field of Classification Search
CPC ........... H04W 4/38; H04W 4/40; H04W 4/06; G08G 1/16
See application file for complete search history.

(56) References Cited

U.S. PATENT DOCUMENTS

2006/0223599 A1　10/2006　Alfaro et al.
2016/0023599 A1　1/2016　Jo
(Continued)

FOREIGN PATENT DOCUMENTS

CN　　105869440 A　　8/2016
CN　　107316436 A　　11/2017
(Continued)

OTHER PUBLICATIONS

International Search Report and Written Opinion mailed on Dec. 2, 2021, received for PCT Application PCT/CN2021/117384, filed on Sep. 9, 2021, 8 pages including English Translation.
(Continued)

*Primary Examiner* — Austin J Moreau
(74) *Attorney, Agent, or Firm* — XSENSUS LLP

(57) ABSTRACT

The present disclosure relates to electronic device and method in a wireless communication system. There is provided a terminal-side electronic device in a wireless communication system includes a processing circuit, which is configured to acquire information about an internal state of a terminal-side device associated with the terminal-side electronic device, and transmit the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

20 Claims, 15 Drawing Sheets

(56)                    References Cited

U.S. PATENT DOCUMENTS

| | | | | |
|---|---|---|---|---|
| 2020/0103551 A1* | 4/2020 | Osumi | .................... | G01W 1/00 |
| 2020/0314612 A1* | 10/2020 | Kang | .................... | H04W 72/20 |
| 2021/0016781 A1* | 1/2021 | Karunai-Ramanujam | ................. | |
| | | | | A61B 5/7405 |
| 2021/0188322 A1* | 6/2021 | Yoshida | ................. | G01C 21/34 |
| 2021/0219116 A1* | 7/2021 | Perras | .................... | H04W 4/40 |
| 2022/0126864 A1* | 4/2022 | Moustafa | .......... | B60W 60/0013 |

FOREIGN PATENT DOCUMENTS

| | | | | | | |
|---|---|---|---|---|---|---|
| CN | 109495151 | A | | 3/2019 | | |
| CN | 209328213 | U | | 8/2019 | | |
| CN | 111052628 | A | | 4/2020 | | |
| CN | 111385762 | B | * | 4/2023 | ............. | H04W 4/40 |
| CN | 111267759 | B | * | 12/2024 | ............. | H04L 67/55 |
| JP | 2000-348300 | A | | 12/2000 | | |
| JP | 104200703 | A | | 12/2014 | | |
| KR | 20180033852 | A | | 4/2018 | | |

OTHER PUBLICATIONS

Etri, "Pre-crash sensing warning updates for V2V unicast communication", 3GPP TSG-SA WG1 Meeting #71, S1-152255, Aug. 17-21, 2015, 3 pages.
Luca Delgrossi et al., "Vehicle security communication protocol, security and privacy", Press of Institute of Beijing Technology, 134-139, Apr. 30, 2015.

* cited by examiner

ELECTRONIC DEVICE AND METHOD IN A WIRELESS COMMUNICATION

CROSS-REFERENCE TO RELATED APPLICATIONS

The present application is based on PCT filing PCT/CN2021/117384, filed Sep. 9, 2021, which claims the benefit of priority to CN application Ser. No. 202010941158.4 filed on Sep. 9, 2020, the entire contents of each are incorporated by reference herein in its entity.

FIELD OF THE INVENTION

The present disclosure relates to electronic device and method in a wireless communication system, and in particular, to electronic device and method for information communication in a wireless communication system.

BACKGROUND

With the development of wireless communication technology and the rapid growth of numbers of automobiles, intelligent transportation has attracted increasing attention and developed rapidly. V2X (Vehicle-to-Everything) technology is a key technology of an intelligent transportation system in the future. It enables vehicle-to-vehicle communication, vehicle-to-base station communication and base station-to-base station communication, and obtains a series of traffic information such as real-time traffic, road informations, pedestrian information and so on, thus improving driving safety, reducing congestion, and improving traffic efficiency, etc.

The NR (New Radio Access Technology in 3GPP)-V2X (Vehicle to Everything) standard formulated by an International Standardization Organization 3GPP (3rd generation partnership project) supports communication between V2V (vehicle to vehicle) and V2I (vehicle-to-roadside unit) in an Internet of Vehicle and can realize richer Internet of Vehicle application scenarios such as vehicle formation, automatic/semi-automatic driving, etc. With the development of communication technology, and the development of 5G-NR (New Radio) related study and standardization, NR-V2X has become a hot research issue. Especially, the vehicle information communication in the V2X scenario deserves to be optimized.

Unless otherwise stated, it should not be assumed that any of the methods described in this section become prior art only because they are included in this section. Similarly, unless otherwise stated, the problems recognized about one or more methods should not be assumed to be recognized in any prior art on the basis of this section.

DISCLOSURE OF THE INVENTION

The present disclosure provides electronic device and method in a wireless communication system, which can improve information communication in the wireless communication system, in particular to provide improved vehicle internal information communication in V2X communication.

An aspect of the present disclosure relates to a terminal-side electronic device in a wireless communication system, including a processing circuit configured to acquire information about internal state of a terminal-side device associated with the terminal-side electronic device, and transmit the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

Yet another aspect of the present disclosure relates to a method for a terminal side in a wireless communication system, comprising acquiring information about internal state of a terminal-side device associated with the terminal-side electronic device, and transmitting the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

Yet another aspect of the present disclosure relates to a non-transitory computer-readable storage medium storing executable instructions thereon, and the executable instructions, when executed, cause implementation of methods as described herein.

In still another aspect, there is provided a wireless communication device. In an embodiment, the wireless communication device comprises a processor and a storage device having stored executable instructions thereon which, when executed, cause implementation of method as described herein.

In still another aspect, there is provided an apparatus comprising means for performing methods as described herein.

DESCRIPTION OF THE DRAWINGS

Hereinafter, the above and other objects and advantages of the present disclosure will be further described in combination with specific embodiments with reference to the accompanying drawings. In the drawings, like terms will be denoted by like reference numerals.

Figure 1:
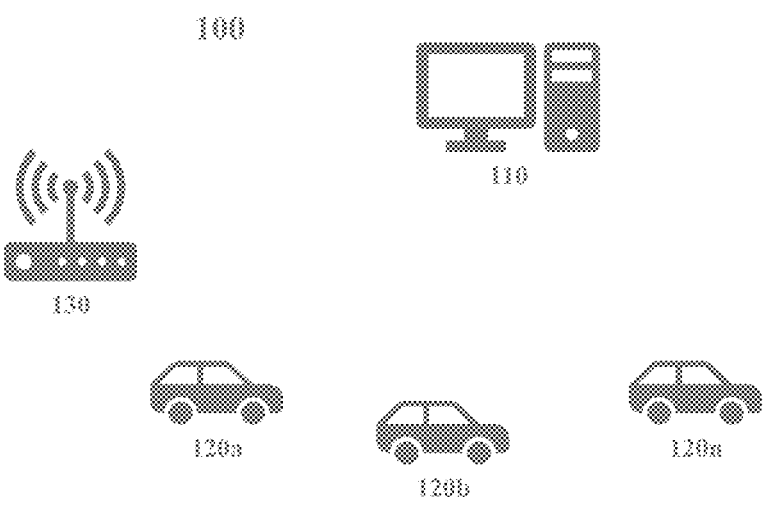
FIG. 1 schematically illustrates a wireless communciaiton system in a V2X communication scenario according to an embodiment of the present disclosure.

Although embodiments of this disclosure may be susceptible to various modifications and alternative forms, the embodiments of the present disclosure are shown by way of example in the drawings and are described in detail herein. It should be understood that the drawings and detailed description thereof are not intended to limit the embodiments to the particular forms disclosed, on the contrary, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For the sake of clarity and conciseness, not all features of the embodiments are described in the description. However, it should be understood that many implementation-specific settings must be made during the implementation of the embodiments in order to achieve specific goals of developers, for example, to meet those constraints related to equipment and business, and these constraints may vary with different implementations. In addition, it should be understood that although the development work may be very complicated and time-consuming, it is only a routine task for those skilled in the art who benefit from this disclosure.

Here, it should also be noted that in order to avoid obscuring the present disclosure by unnecessary details, only processing steps and/or equipment structures closely related to the schemes at least according to the present disclosure are shown in the drawings, while other details not closely related to the present disclosure are omitted. It should be noted that similar reference numerals and letters indicate similar items in the drawings, and therefore, once an item is defined in one drawing, there is no need to discuss it for subsequent drawings.

In this disclosure, the terms "first", "second" and the like are only used to distinguish elements or steps, and are not intended to indicate time sequence, preference or importance.

With the development of intelligent transportation, V2X (Vehicle-to-Everything) technology is a key technology of an intelligent transportation system, has been been paid more and more attention and widely used. It enables vehicle-to-vehicle communication, vehicle-to-base station communication and base station-to-base station communication, and obtains a series of traffic information such as real-time road condition, road information, pedestrian information and so on. In particular, traffic accidents caused by vehicles occur frequently, and in order to avoid more huge losses caused by traffic accidents, V2X can provide safety warning for vehicles, improve driving safety and reduce traffic accidents.

Autonomous vehicles will periodically broadcast basic safety messages (BSM) when driving on the road. BSM contains information about vehicle-related states of the autonomous vehicles, which has been or not been processed after detection by sensors, especially the information about vehicle external driving states, such as vehicle surrounding environment, vehicle driving trajectory, vehicle speed and so on. When surrounding vehicles or RSUs receive this message, by demodulating and decoding corresponding data, they can know basic states of the broadcast vehicles, whether there exists an abnormal driving behavior or abnormal vehicle state information. Therefore, this message is helpful to improve safety for autonomous vehicles driving on the road, while it will be provided an early warning indication in case of abnormal states. In addition, BSM can also, by mean of expansion, include automatic driving level, current driving lane and driving scheduling of the vehicle.

However, in the current application standards and practical application scenarios, the consideration for safety mainly relates to the external driving state information of the vehicle, but the state inside the vehicle is not considered. On the contrary, the state inside the vehicle is equally important to ensure safe driving of autonomous vehicles, and even can help to find out any abnormal driving state in advance, so as to give a safety alarm in advance and get proper treatment, and further improve the safety.

In view of this, this disclosure proposes to actively collect vehicle internal information, and share a part or all of the information to other devices in V2X, for example a control-side device in V2X, such as server or MEC (Multiple Access Edge Computing) device, roadside device, or other vehicle in V2X, periodically or in a trigger manner. The control-side device can comprehensively judge whether to enable remote control of the vehicle, based on overall traffic condition at the location of the reporting vehicle, especially in the case of existence of VRU.

Particularly, the present disclosure proposes to actively collect internal data of an autonomous vehicle, and when the internal data indicates there exists an abnormal state or it is not suitable to continue driving, actively share the abnormal state in the V2X system, in particular, report the abnormal state to the control-side device, and/or broadcast the abnormal state to adjacent vehicles, so that the vehicles driving on the road will notice the abnormal vehicle at the first time to avoid it or assist in parking, instead of relying on the macro-control or scheduling of the server. Moreover, upon an autonomous vehicle actively warns, the control-side device can take over the vehicle. In this way, the reaction time delay of effective control for the abnormal driving vehicle and the abnormal area when an abnormal case occurs can be minimized.

Furthermore, this disclosure also proposes to classify information collected inside the vehicle, in particular, divide the information collected inside the vehicle into safety-related information and non-safety-related information, so that the information can be distinguished and shared, for example, only the safety-related information can be shared, especially undergo information encryption, so that it can be shared with other devices in V2X while the user privacy can be protected to the maximum extent.

Moreover, the present disclosure also proposes information sharing in a vehicle fleet mode in V2X scenario. In particular, one vehicle in the vehicle fleet can be used as header vehicle, and the other vehicles can be used as follower vehicles. During work, the header vehicle in the vehicle fleet is responsible for information collection of all or part of vehicles in the vehicle fleet, such as collecting internal detection information of all or part of the follower vehicles, and uploading the information to the control-side device, and/or is responsible for sharing the information among vehicles in the vehicle fleet. In this way, centralized processing and communication of vehicle internal information can be realized, and communication efficiency and information management of vehicle internal information can be effectively improved.

The solution according to the present disclosure will be described below mainly in connection with a V2X communication transmission scenario. In this disclosure, communication among various devices in V2X, such as communication between autonomous/semi-autonomous vehicles, between vehicles and base stations, servers and roadside devices, can be realized by a wireless communication technology such as 4G, 5G, etc., and correspondingly by various communication manners such as direct communication, multicast, broadcast and so on. It should be pointed out that V2X is only an example, and the basic concept of the present disclosure can be applied to other similar application scenarios, especially application scenarios that need to monitor internal information of equipments in order to improve processing efficiency and security, such as Internet of Things, Internet of flight equipments, other types of equipment networking systems, etc.

FIG. 1 shows a schematic diagram of a wireless communication system 100 in a V2X application environment according to an embodiment of the present disclosure. The wireless communication system 100 may include terminal-side electronic devices 120a, 120b, and 120n. Although three terminal-side electronic devices are shown in FIG. 1, it should be understood that the wireless communication system 100 may also include any other suitable number of terminal-side electronic devices.

In this disclosure, the term "terminal-side electronic device" has the full breadth of its usual meaning, and at least includes a terminal equipment used as a part of a wireless communication system or a radio system to collect and transmit information about internal state of a terminal-side device (such as vehicles in V2X, UAVs, robots, etc., in similar application scenarios), or elements of the terminal equipment. In some embodiments, the terminal-side electronic device may be the terminal-side device (such as a vehicle) per se, or an electronic device used in combination with the terminal-side device, such as an in-vehicle device. In this disclosure, the terminal-side electronic devices 120a, 120b, and 120n collect information about vehicle internal state, which can be shared within V2X, such as among vehicles, or transmitted to a server or MEC or roadside unit in V2X.

In some embodiments, the wireless communication system 100 may also optionally include control-side electronic devices 110 and 130, which may be configured to communicate with terminal-side electronic devices through wireless communication technologies such as 4G, 5G, etc. Among them, the server, MEC, and roadside unit can all be examples of control-side electronic devices. For example, the control-side electronic device 110 can correspond to the server or MEC, and the control-side electronic device 130 can correspond to the roadside unit.

In this disclosure, "control-side electronic device" has the full breadth of its usual meaning, and for example, it can include an equipment that is used as a part of a wireless communication system or a radio system to facilitate vehicle state determination and/or vehicle scheduling. In some embodiments, the control-side electronic device may be, for example, a base station (e.g., gNB), a server or MEC, or a roadside unit (RSU), etc., in V2X system, or a part thereof. In this disclosure, the term "base station" has the full breadth of its usual meaning, and includes at least a wireless communication station that is used as part of a wireless communication system or radio system for communication. As an example, the base station may be, for example, an eNB following the 4G communication standard, a gNB following the 5G communication standard, a remote radio head-end, a wireless access point, an unmanned aerial vehicle control tower, or a communication device performing similar functions.

During driving in the V2X cenario, an vehicle can detect information about itself and its surrounding environment, and share the detected information with other devices in V2X, such as the server 110, the roadside unit 130, and other vehicles, thus helping the vehicle information to be known by other devices in V2X in time.

The server 110 can appropriately control vehicles, such as schedule vehicle driving, based on the shared vehicle information. As an example, the server 110 can perform scheduling based on the received vehicle information, in order to improve the vehicle communication efficiency, and in case that the received vehicle information indicates that a vehicle is abnormal, can also directly deal with the abnormal vehicle, so as to avoid traffic jams caused by traffic accidents. In addition, the server 110 can also inform other vehicle devices of the received information, thus realizing information sharing. The information may be sent to the server via the base station, or the server may be deployed at the base station, as a part of the base station.

The roadside unit 130 can serve as a relay device to provide the received information to the server, or transmit the received information to vehicles within its communication range, thus contributing to information sharing in V2X. In particular, the roadside unit 1 can also serve as a control-side device, and appropriately controls vehicles within its communication range, similar to the processing of the server described above.

Vehicles 120a, 120b, . . . , 120n can also share vehicle information thereamong, for example, vehicles within a certain distance range can communicate with each other through various appropriate communication manners to realize information sharing. Particularly, in V2X, vehicles can drive in a vehicle fleet, and the vehicles in the vehicle fleet can be arranged in a specific positional relationship, such as in a row, based on driving modes of the vehicles, while information sharing can be realized between adjacent vehicles and between the vehicles and a header vehicle in the vehicle fleet. For example, vehicles in the vehicle fleet can share information in the vehicle fleet through multicast via sidelink. This is also applicable to other wireless communication scenarios performing multicast communication via sidelink, such as formation flight of unmanned aerial vehicles, formation operation of intelligent factory robots, etc.

Figure 2:
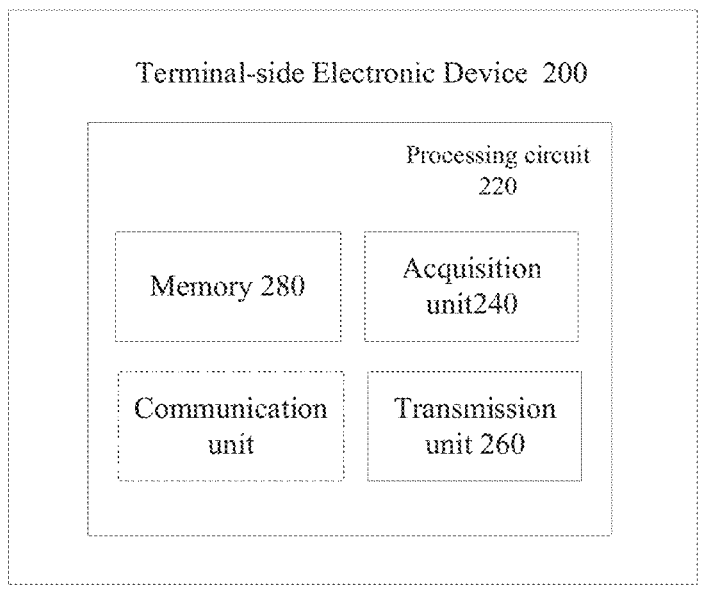
FIG. 2 illustrates a block diagram of a terminal-side electronic device in a wireless communication system according to an embodiment of the present disclosure.

FIG. 2 shows a schematic block diagram of a terminal-side electronic device 200 according to an embodiment of the present disclosure. The terminal-side electronic device 200 may correspond to the terminal-side electronic device 120a, 120b, or 120n in FIG. 1, which may communicate with the control-side electronic device in the wireless communication system. As shown in FIG. 2, the terminal-side electronic device 200 may include a processing circuit 220.

According to an embodiment of the present disclosure, the processing circuit 220 may be configured to acquire information about internal state of a terminal-side device associated with the terminal-side electronic device, and transmit the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

Here, the terminal-side device may refer to a device that cooperates with the terminal-side electronic device, or the terminal-side electronic device may be included in the terminal-side device or even be the terminal-side device per se. For example, the terminal-side device can be a vehicle in V2X, and the terminal-side electronic device can be an in-vehicle electronic device or even be the vehicle per se. The following description will mainly take V2X and devices therein as examples. It should be pointed out that the following description can also be applied to other devices that can collect and transmit internal state information in similar networking scenarios.

According to an embodiment of the present disclosure, the information about internal state of a terminal-side device may include a part or all of the information reflecting the internal state of the terminal-side device, such as sound, image, etc., which can be collected/acquired by an appropriate sensing device. As an example, in the case where the terminal-side device is a vehicle, the sound information according to the present disclosure may include sound contents in the vehicle internal environment, such as driver's voice, passenger's voice, operating sounds of in-vehicle equipments, and etc. The sound contents can be collected/acquired by a sound sensor as an example of the sensing device. The sound sensor can be in various forms (such as microphone, etc.) and disposed at an appropriate position inside the vehicle. The image information according to the present disclosure may include image contents in the vehicle internal environment, such as driver images, passenger images, in-vehicle equipment images, etc. The image contents can be captured/acquired by an image capturing device which is an example of the sensing device, such as a camera. The image capturing device can take various forms, and can be disposed at an appropriate position inside the vehicle.

According to another embodiment, in order to reduce bandwidth consumption of information transmission, the transmitted information about internal state may include the result of preliminary judgment based on the collected/acquired contents. Particularly, the information about internal state of the terminal-side device may also include indication information indicating whether the internal state of the terminal-side device is abnormal, which can be, for example, obtained by analyzing the aforementioned information reflecting internal state of the terminal-side device, and can be, for example, in a binary form. As an example, the indication information may be indication information indicating whether the sound/image contents in the vehicle internal environment are abnormal. As another example, the transmitted information may also include sample contents collected by the sensing device, such as sample sounds, images, etc. This can effectively reduce the data transmission overhead.

According to an embodiment of the present disclosure, the vehicle internal state information may include at least one of vehicle driver status information, vehicle passenger status information, and vehicle internal equipment status information.

According to an embodiment of the present disclosure, the vehicle driver status information can be used to indicate the vehicle driver staus, so as to timely and accurately determine whether the vehicle driver status is normal. As an example, the vehicle driver status information can include information about at least one of orientation of driver's sight, orientation of driver's head, position of driver's hands, driver's health status (heart rate, breathing, etc.), whether the driver is sleepy, whether the driver is too excited, and whether the driver is inattentive.

As an example, the vehicle driver status information may be collected driver's voice, image, physical condition parameters, etc., which can be acquired by microphone, image capturing device, physical condition acquisition device, etc., as described above. For example, the driver's sight orientation, head orientation, hand position, etc. can be collected by using an image pickup device near the vehicle driver's seat, such as the image pickup devices near the steering wheel and the front windshield of the vehicle. The driver's health status (heart rate, breathing, etc.), whether the driver is sleepy, whether the driver is too excited, whether the driver is inattentive, etc. can also be collected by the above-mentioned device or a physical condition collection device worn by the driver, and/or can also be analyzed and judged in the in-vehicle device. In this case, as an example, the vehicle driver status information can be expressed in a binary form, for example, binary values 0 and 1 indicate different conditions respectively, such as 1 indicating sleepy and 0 indicating not sleepy.

As another example, the vehicle driver status information may also be the result information determined after an in-vehicle device analyzes the collected driver status, such as by analyzing the collected sounds, images, physical condition parameters, etc. to judge whether the driver is abnormal or not, and sharing the judgment result as the vehicle driver status information in V2X. As an example, in this case, the vehicle driver status information may be a binary value, such as 1 indicating abnormal and 0 indicating not abnormal.

By monitoring the driver status and timely transmitting relevant information when the driver status is abnormal, for example, timely reporting the information to the server for processing, risks can be dealt with as early as possible, and the occurrence of safety accidents can be avoided. For example, when the driver shows signs such as physical discomfort and inattentive, etc., such case can be dealt with in time before the vehicle drives abnormally, so as to perform control timely before occurrence of any driving safety accident and effectively avoid the occurrence of accident.

According to an embodiment of the present disclosure, the vehicle passenger status information can indicate status of passenger inside the vehicle, so as to accurately check whether the status of passenger inside the vehicle is normal. According to an embodiment, the vehicle passenger status information includes information about at least one of the following: passenger's facial expression, passenger's health, passenger's vital signs. Similar to the vehicle driver status information, the vehicle passenger status information can be sound, image or any other appropriate form of information, and can be acquired by a corresponding device installed in the vehicle, etc. In particular, the vehicle passenger status information can be the result information determined by an in-vehicle device performing analysis, which can be, for example, expressed in a binary form, for example, 1 indicating good health and 0 indicating poor health.

By monitoring the status of passenger inside the vehicle, and transmitting relevant information in time upon the status of passenger in the vehicle is abnormal, such as timely reporting the information to the server for processing, the safety of passenger can be guaranteed in time. For example, the vehicle driving route can be modified in time, such as proceeding to a hospital to treat the passenger, or even this information can be reported to the hospital so that medical staff and equipments can be prepared in advance, so as to achieve proper rescue for the passenger and effectively ensure the safety of passenger.

According to an embodiment of the present disclosure, the vehicle internal equipment condition information can be used to indicate the intact condition of a vehicle internal equipment, so as to accurately check whether there is a safety risk in the vehicle. According to an embodiment, the vehicle internal equipment condition information includes information about at least one of the following: whether the windshield is damaged, whether the skylight is damaged, whether the window is damaged, and whether the air conditioner in the vehicle works normally. Similar to the foregoing, the vehicle internal equipment condition information can be in any suitable form and acquired by an appropriate device, for example, it can be an image captured by an in-vehicle camera device, and/or it can be the result information determined by an in-vehicle device performing analysis, for example, it can be expressed in a binary form, such as 1 indicating good condition and 0 indicating broken or abnormal operation.

By monitoring the status of the vehicle internal equipment and reporting the relevant information to the server for processing in time when the vehicle internal equipment is abnormal, the driving route can be changed in time or stopped temporarily, and the vehicle internal equipment can be properly debugged or maintained, which can reduce the risk of danger occuring during the vehicle driving, and improve comfort of passengers.

An exemplary format of vehicle internal state information according to the present disclosure is as follows.

```
IncabinMsg ::= SEQUENCE {
        msgtCnt MsgCount,
        id OCTET STRING (SIZE(8)),
     -- temperary vehichle ID,    /ID of a vehicle whose internal state information is
  provided /
            -- equipmentType EquipmentType, /vehicle type , follower vehicle or header
vehicle/
            -- secMark DSecond,
            sensorPos Position3D,   /position of a vehicle transmitting message /
            --msgType CHOICE { /the following indicates the type of a message source:
driver/passenger/equipment /
                driverstatus DriverStatus,
                passengerstatus PassengerStatus,
                hardwarestatus HardwareStatus,
                driver & passenger DPStatus,
                driver & hardware DHStatus,
                passenger & hardware PHStatus,
                ...
        }
   }
        DriverStatus   ::=Bitstring   {/the following indicates contents possibly
        included in the driver status information/
        microsleep detection        (0),
        face&emotionrecognition         (1),
        headsposition                   (2),
        heartrate                       (3),
        breathingrythem                 (4),
        viewdirection                   (5),
        gesture                     (6)
   }SIZE((6,...))
     PassengerStatus   ::=BITSTRING{/   the following indicates contents possibly
included in the passenger status information /
        face&emotionrecognition         (0),
        headsposition                   (1),
        heartrate                       (2),
        breathingrythem                 (3),
        --children surveillance for life presence check
        movement                        (4),
   }SIZE((4,...))
     HardwareStatus   ::=BITSTRING{/   the following indicates contents possibly
included in the vehicle internal equipment status information /
        windshield        (0),
        steeringwheel         (1),
        backmirror        (2),
        audiosystem           (3),
        movement          (4),
        ...
   }SIZE((4,...))
DPStatus ::=BITSTRING{
-------driver-status-below--------------------
        drmicrosleepdetection               (0),
        drface&emotionrecognition           (1),
        drheadsposition             (2),
        drheartrate                 (3),
```

-continued

```
        drbreathingrythem        (4),
        drviewdirection          (5),
        drgesture                (6),
-------passenger-status-below-----------------
        psface&emotionrecognition      (7),
        psheadsposition          (8),
        psheartrate              (9),
        psbreathingrythem        (10),
        --children surveillance for life presence check
        psmovement                     (11),
        ...
    }SIZE((11,...))
```

It should be noted that the above is only examplary, and the vehicle internal state information according to the present disclosure may be in any other form and may also include other information elements.

According to an embodiment of the present disclosure, the vehicle internal state information may be information after specific processing. As an example, the specific processing may include noise reduction, tuning, contrast enhancement, encryption, coding and other processes well known in the art for the collected sound, image, parameters, etc. As another example, the specific processing may include a filtering/selection process, especially a filtering operation for filtering out non-safety information in the vehicle internal state information, such as privacy-related information of drivers and passengers, other videos, entertainments and the like in the vehicle. In this case, this information is the information filtered after the non-safety information is removed, so that only the information related to vehicle safety remains, such as the information about driver's safety status, passenger's safety status, vehicle equipment's intact status, etc., which can protect the privacy of people inside the vehicle appropriately while improving the vehicle safety.

According to an embodiment of the present disclosure, the terminal-side electronic device, such as autonomous vehicle, can periodically share the acquired vehicle internal state information with other devices in the wireless communication system, such as a control-side electronic device (such as server, roadside unit) and other terminal-side electronic devices, such as autonomous vehicles.

As an example, this period can be set in advance when the vehicle is produced, and as another example, this period can be set by the server or MEC or roadside unit in the system, and informed to the vehicles during communication, so that the vehicles can collect the vehicle internal information at specific time intervals and share it in the communication network.

According to an embodiment of the present disclosure, the vehicle internal state information can be collected and/or transmitted in a trigger manner, so that the vehicle will perform collection and/or transmission of information only when a certain trigger condition is met. As an example, it can be triggered by the controller, MEC, roadside unit or other vehicles in V2X, or it can be triggered by the vehicle itself in response to a specific condition.

According to an embodiment of the present disclosure, it can be event triggered. Particularly, when it is necessary to perform an event that would utilize the vehicle internal state information or it is necessary to verify an event analysis result by using the vehicle internal state information, the transmission of the vehicle internal state information can be requested/instructed. As an example, the events may include analysis of the vehicle trajectory performed by the server in the system, analysis of the overall traffic condition performed by the server, analysis and judgment of the results reported by other devices on the road performed by the server, and so on. In this way, when the above events or similar events need to be carried out, or the relevant results of events are obtained, the vehicle can be triggered to transmit information. As an example, it can be triggered by a cloud server or MEC or roadside device, so as to share the vehicle internal information. As another example, when a vehicle receives a request from another vehicle in the communication range or a vehicle in a fleet for sharing information among vehicles, the vehicle can share the vehicle internal state information.

According to another embodiment, it can be triggered by the vehicle per se. For example, when the in-vehicle device analyzes that the information collected by the sensor indicates the vehicle internal state being abnormal, the vehicle actively shares information with the server, MEC, roadside device or other devices in V2X, so that the abnormal state can be dealt with in time.

According to an embodiment of the present disclosure, the processing circuit actively broadcasts the detected vehicle internal state information when the vehicle is not within a network coverage. As an example, when the vehicle cannot communicate with the server, MEC, roadside unit, etc. due to V2X communication failure, upon an abnormal state is detected inside the vehicle, the processing circuit can share information with adjacent vehicles or devices in appropriate manners, which can include any one or more of broadcast, multicast, unicast, etc., and are not particularly limited, as long as the abnormal state inside the vehicle can be received timely. As an example, the detected abnormal vehicle internal state information can be actively broadcasted to prompt the vehicles on surrounding roads to pay attention to avoidance. Therefore, the neighboring vehicles can know the state and information of the abnormal vehicle in time, and forward the information to the server, MEC, roadside equipment, etc. in V2X in time, so that the neighbouring vehicles can perform avoidance in time, the server can know the vehicle internal failure information in time, and make unified scheduling and arrangement.

According to another embodiment, it can be resource-triggered. In particular, it can be decided whether to transmit the vehicle internal state information according to availability of information transmission resources. As an example, the server schedules some autonomous vehicles to share vehicle internal state information based on current usage of uplink resources, and the vehicles transmit information in response to the scheduling instruction. As another example, the vehicles can also actively transmit information when it is detected that there are resources available for transmitting information to the system.

According to an embodiment of the present disclosure, the vehicles in V2X can run in the form of a fleet, wherein one vehicle will act as a header vehicle and other vehicles as follower vehicles, and in the fleet driving mode, the header vehicle is mainly responsible for communication with other devices in V2X. For example, the header vehicle can be responsible for information sharing among vehicles in the fleet, and information transmission from vehicles in the fleet to the server, roadside units and other vehicles. Therefore, when the vehicles drive in the form of a fleet, the information of follower vehicles in the vehicle fleet will be transmitted to the header vehicle, and the information sharing will be realized by the header vehicle of the vehicle fleet.

According to an embodiment of the present disclosure, the vehicle is the header vehicle in the vehicle fleet, and the processing circuit is further configured to collect information of follower vehicles in the vehicle fleet, and share the collected information of the follower vehicles along with the information of the vehicle itself. As an example, the information can be sent by the header vehicle to the server, MEC, roadside devices, etc. in V2X. As another example, the information can be shared by the header vehicle among the members of the vehicle fleet.

According to another embodiment of the present disclosure, the vehicle is a follower vehicle in a vehicle fleet, and the processing circuit is further configured to transmit the information about internal state of the vehicle to the header vehicle in the vehicle fleet periodically or in a trigger mode.

In the structural example of the above device, the processing circuit 220 may be in the form of a general-purpose processor, or may be a dedicated processing circuit, such as an ASIC. For example, the processing circuit 220 can be configured by a circuit (hardware) or a central processing device such as a central processing unit (CPU). In addition, the processing circuit 220 may carry a program (software) for operating the circuit (hardware) or the central processing device. The program can be stored in a memory (such as arranged in the memory) or an external storage medium connected from the outside, and downloaded via a network (such as the Internet).

According to one embodiment, the processing circuit 220 may include various units for realizing the above functions, such as acquisition unit 240 configured to acquire information about internal state of a terminal-side device associated with the terminal-side electronic device, and transmission unit 260 configured to transmit the information about the internal state of the terminal-side device to another device in the wireless communication system periodically or in a trigger mode, wherein the transmission unit 260 is configured to, once information about abnormal internal state of the terminal-side device is acquired, actively broadcast the information about the abnormal internal state of the terminal-side device to a surrounding communicable terminal-side electronic device.

According to another embodiment, the processing circuit may include an unit for analyzing/judging collected information, for example, anaylzing/judging collected sound, contents, parameters, etc., to determine whether there exist any abnormal state inside the vehicle, here the analysis/judgement result can be used as the internal state information. The unit can be included in the acquisition unit 240 or outside the acquisition unit 240.

According to another embodiment, the processing circuit may further include a collection unit for collecting information of follower vehicles in the fleet, in the fleet driving mode, and a sharing unit for sharing the information of the vehicle itself together with the collected information of the follower vehicles in V2X. For example, the information can include at least one of vehicle internal state information, entertainment information, etc. As an example, the collection unit can be included in the acquisition unit 240 or outside the acquisition unit 240, and the sharing unit can be included in the transmission unit 260 or outside the transmission unit 260.

According to another embodiment, the processing circuit may further include a supply unit for supplying the information about vehicle internal state to a header vehicle in the fleet periodically or triggeredly, in the fleet driving mode. Additionally, the supply unit can provide entertainment information, etc. to the header vehicle. As an example, the supply unit can be included in the transmission unit 260 or outside the transmission unit 260.

The above units can operate as described above, and will not be described in detail here. It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as separate physical entities, or may be implemented by a single entity (for example, a processor (CPU or DSP, etc.), an integrated circuit, etc.). Note that although each unit is shown as a separate unit in FIG. 2, one or more of these units may be combined into one unit or split into multiple units. Furthermore, that the foregoing units are indicated by dotted lines in the FIG. indicates that the foregoing units may not actually exist, and the operation/functionality they achieve can be implemented by the processing circuit itself.

It should be understood that FIG. 2 is only a schematic structural configuration of the terminal-side electronic device, and alternatively, the terminal-side electronic device 200 may also include other components not shown, such as a memory, a radio frequency link, a baseband processing unit, a network interface, a controller, and the like. The processing circuit may be associated with a memory and/or an antenna. For example, the processing circuit can be directly or indirectly connected to the memory (for example, other components may be interposed therebetween) to access data. The memory can store various kinds of information (e.g., vehicle internal state information and its analysis result, etc.) acquired and generated by the processing circuit 220, programs and data for the operation of the terminal-side electronic device, data to be transmitted by the terminal-side electronic device, etc. The memory can also be located in the terminal-side electronic device but outside the processing circuit, or even outside the terminal-side electronic device. The memory can be volatile memory and/or nonvolatile memory. For example, the memory may include, but is not limited to, random access memory (RAM), dynamic random access memory (DRAM), static random access memory (SRAM), read only memory (ROM) and flash memory.

For example, the processing circuit can be directly or indirectly connected to the antenna to send information and receive requests/instructions via the transmission unit. For example, as an example, the antenna may be an omni-directional antenna and/or a directional antenna, which may be implemented in various ways, such as an antenna array (such as both omni-directional antenna and directional antenna, or a single antenna array capable of realizing the functions of both omni-directional antenna and directional antenna) and/or a radio frequency link, which will not be described in detail here. As an example, the antenna may also be included in the processing circuit or external to the processing circuit. It can even be coupled/attached to the electronic device 200 without being included in the electronic device 200.

Figure 3:
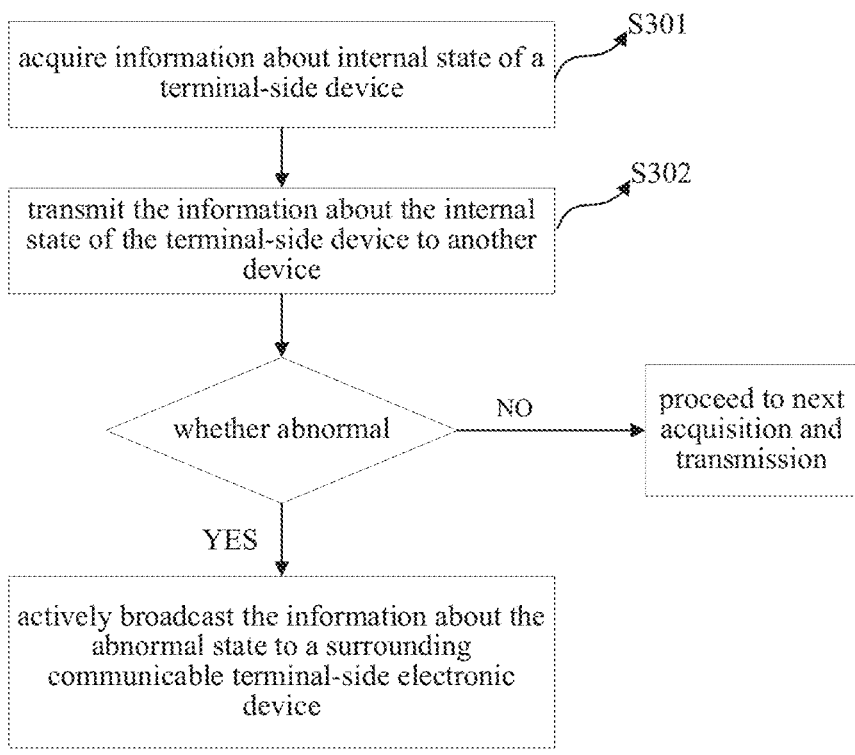
FIG. 3 illustrates a flowchart of operations executed by a terminal-side electronic device in a wireless communication system according to an embodiment of the present disclosure.

The method for a terminal side in a wireless communication system according to the present disclosure will be described below with reference to the figures, and FIG. 3 illustrates a flowchart of the method for the terminal side in a wireless communication system according to the present disclosure.

In step S301, information about internal state of a terminal-side device can be acquired, in step S302, the information about the internal state of the terminal-side device can be transmitted to another device in the wireless communication system periodically or in a trigger mode, particularly, it is detected whether there exists abnormal state in interior of the terminal-side device, and once information about an abnormal internal state of the terminal-side device is acquired, the information about the abnormal internal state of the terminal-side device is actively broadcasted to a surrounding communicable terminal-side electronic device. On the other hand, if there does not exist abnormal state, the next information transmission, such as periodical information transmission or triggered information transmission, will be performed. Here, the internal state information and abnormal state information will be the above-mentioned information, and the description will not be repeated here. In addition, the method may also include corresponding steps to realize the above-mentioned operations performed by the terminal-side electronic device, and the description will not be repeated here.

It should be noted that these steps can be performed by the aforementioned terminal-side electronic device according to the present disclosure, in particular by the corresponding units of the aforementioned terminal-side electronic device according to the present disclosure, or can be performed by an appropriate terminal-side device.

An exemplary first embodiment according to the present disclosure will be described below with reference to FIGS. 4A to 4B. In this embodiment, an autonomous vehicle actively collects the vehicle internal data through sensors deployed in a cockpit, and periodically transmits the information to V2X server or MEC, or roadside units or other vehicles in the system.

Figure 4A:
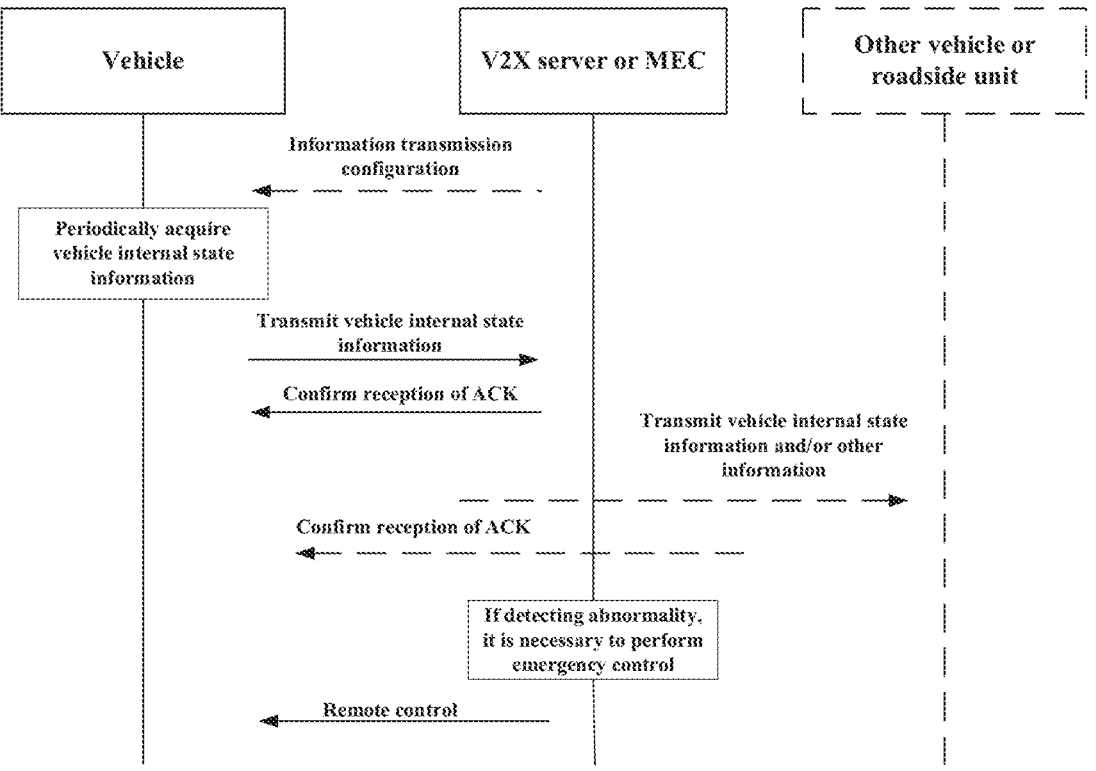
FIGS. 4A and 4B illustrate signaling interaction flows according to a first embodiment of the present disclosure.

FIG. 4A shows a signaling diagram of periodic information transmission according to a first embodiment of the present disclosure. After autonomous vehicles are networked, the periodic transmission mode is configured by the network. For example, it may be informed by the V2X server or MEC to the vehicles, which includes configuration information about periodic transmission. Of course, this is not limitative, and the configuration information about periodic transmission can also be informed to the vehicles in any other way, so it is shown by a dotted line in the figure. As an example, in periodic transmission, it can be transmitted together with BSM just like BSM. In this way, the autonomous vehicle will acquire the vehicle internal state information and expand the BSM with this information, and share the expanded BSM according to the configured transmission cycle regularly, in which the expanded content (vehicle internal data collection) is always on relative to the BSM, that is, as long as the BSM is sent, the expanded content must be sent. Of course, the detected information can be independent of BSM, for example, transmitted by another signaling.

After receiving the vehicle internal state information, V2X server or MEC will send confirmation information to the vehicle. In addition, if the V2X server or MEC confirms that the vehicle state is abnormal according to the vehicle internal state information, the emergency control is started, and the vehicle is remotely controlled through the network.

In addition, the vehicle internal state information can also be transmitted to other vehicles or roadside units in the system, and it can be transmitted via PC5 communication or other suitable communication manners.

In order to protect vehicle internal privacy, such as privacy in the vehicle cockpit, as much as possible, this embodiment further performs some processings, including but not limited to, analysis, selection/filtering, encryption and so on. The analysis process belongs to a simple judgment, and will not occupy too much V2X computing unit, compared with the processings by V2X server or MEC. Non-safety-related information will not be actively shared with the server, and such information may include, but not limited to, the driver's facial expressions, conversations in the cockpit, etc. Therefore, under the condition of saving information transmission overhead, the privacy inside the vehicle can be properly protected. If the server directly requests non-safety related information, the intelligent cockpit can simply process the collected information and then share it. For example, for protection of privacy, the driver's direct facial expression can be protected through feature extraction and virtualization; and the conversation information collected in the cockpit can be converted into text through speech recognition.

Figure 4B:
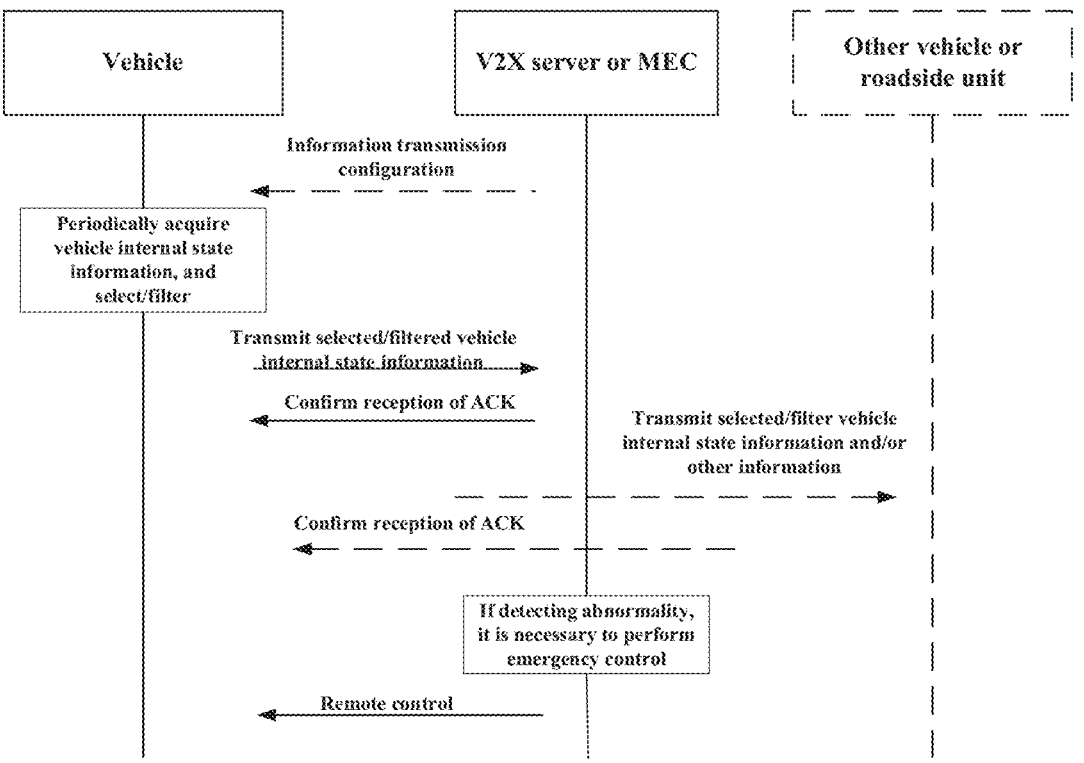

FIG. 4B illustrates an example of further processing for information transmission according to an embodiment of the present disclosure. Among them, the V2X server or MEC informs the vehicle of transmission manner of the vehicle internal state information in advance, as indicated by the dotted arrow. In this way, the vehicle can periodically acquire the vehicle internal state information, perform filtering/selection or other processings on the information, and then send the filtered/selected information (e.g., information after removing non-safety related information, etc.) to V2X server or MEC or other vehicles or roadside units, for example along with BSM, as in the first embodiment, so that privacy can be better protected. It should be pointed out that the further processings on the information as described above can be carried out by the vehicle on its own initiative or in response to requirements from other devices in the system, such as V2X server or MEC.

An exemplary second embodiment according to the present disclosure will be described below with reference to FIGS. 5A and 5B. In this embodiment, the autonomous vehicle actively collects vehicle internal data through sensors deployed in the cockpit, and transmits information in a trigger manner, especially in response to requests from other devices in the system. Triggered information transmission belongs to aperiodic transmission. The configuration information about the triggered transmission can also be informed to the vehicle by V2X server or MEC during networking, or the vehicle can learn the configuration information in other ways, which will not be described in detail here.

Figure 5A:
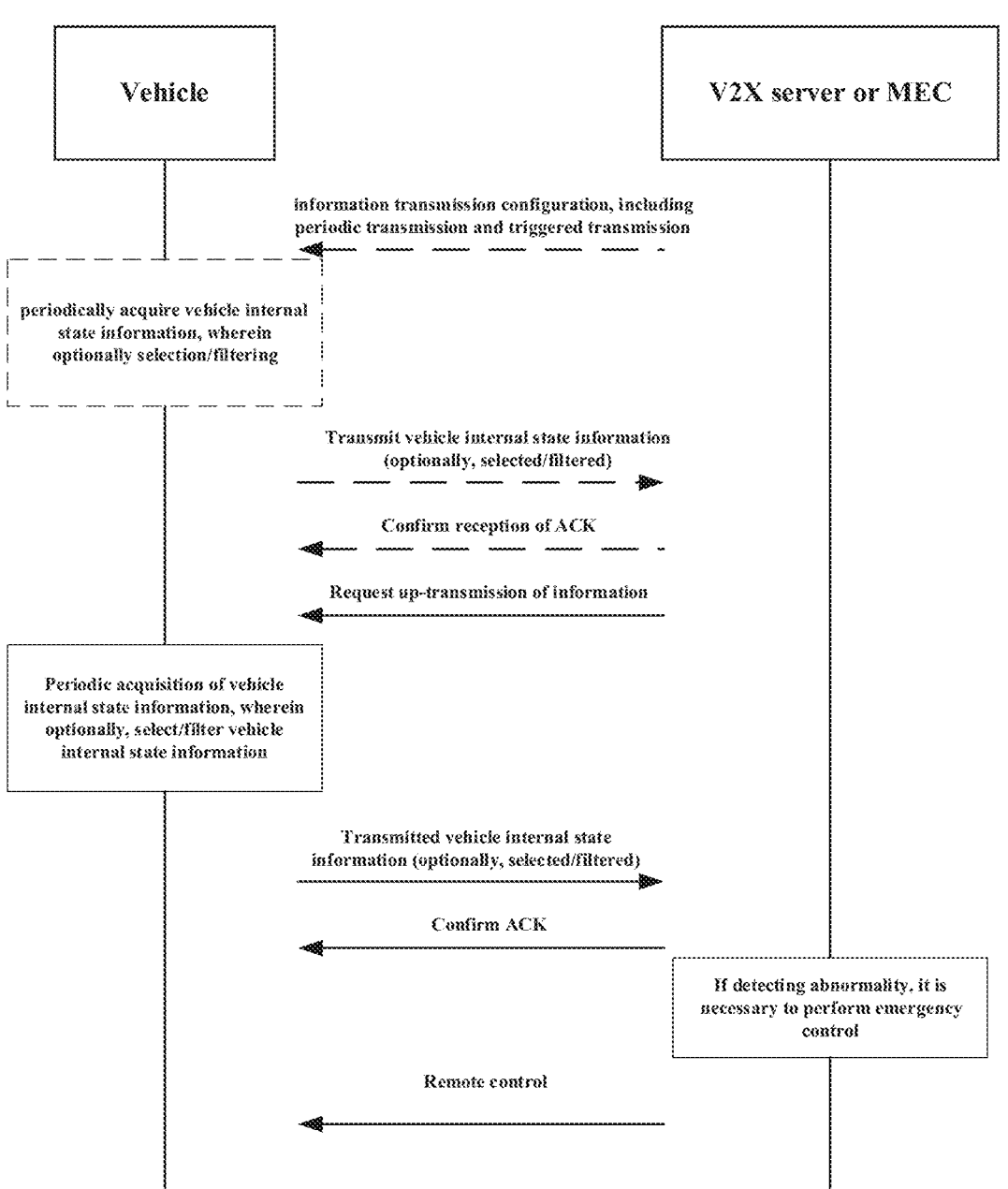
FIGS. 5A and 5B illustrate signaling interaction flows according to a second embodiment of the present disclosure.

FIG. 5A shows a signaling interaction process of triggering information transmission in response to a request from V2X server or MEC according to this embodiment. The V2X server or MEC sends an information transmission request to the vehicle, such request may be made by the V2X server or MEC in response to event trigger and/or resource trigger, which may be that as described above and will not be described in detail here. In response to the request from V2X server or MEC, the vehicle can send the collected vehicle internal state information to the V2X server or MEC. Aperiodic data can be embedded in BSM as an extension of BSM, like the periodic scenario, and sent along with BSM. The detected information can also be independent of BSM and sent by other signaling. After receiving the vehicle internal state information, the V2X server or MEC will send confirmation information to the vehicle. In addition, if the V2X server or MEC confirms that the vehicle state is abnormal based on the vehicle internal state information, an emergency control is started, and the vehicle is remotely controlled through the network.

It should be noted that triggered transmission and periodic transmission can be used together. Particularly, the vehicle internal state information can be transmitted periodically in general, and transmitted in the trigger mode when a request from V2X server or MEC is received. In addition, the transmitted information can optionally be further processed, as described above, and the description will not be repeated here. In this case, the manner of periodic transmission may be as shown in FIG. 4A or 4B, and indicated by a dotted line in FIG. 5A.

Figure 5B:
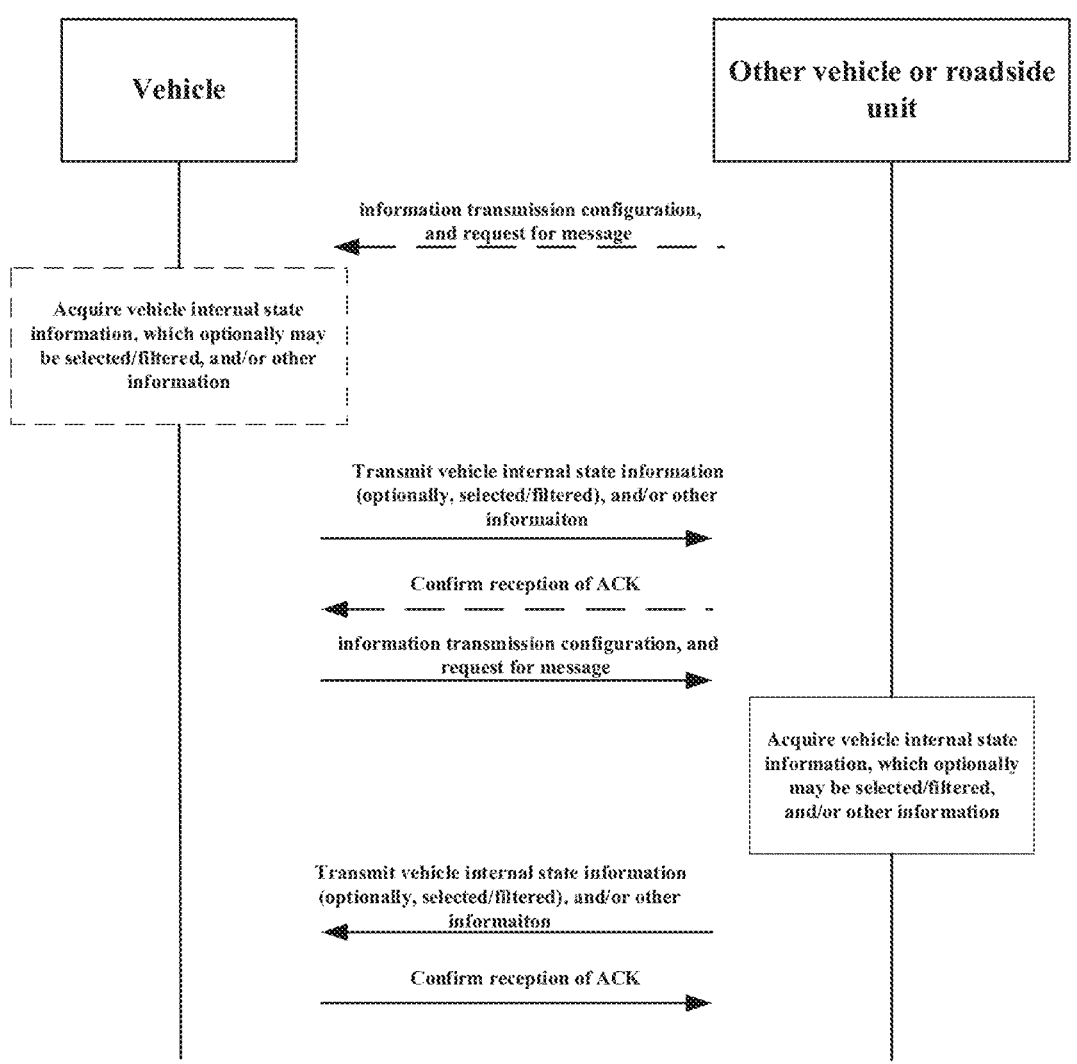

FIG. 5B shows a signaling interaction process of triggering information transmission in response to transmission requests from a roadside unit or other vehicles in the system according to this embodiment. For example, in the case of information sharing between vehicles, the vehicles can make requests to each other, so that the vehicles can share information with each other. Information sharing between vehicles can be carried out through PC5 communication. As an example, in order to support the immersive game entertainment experience in the intelligent cockpit, the information perceived in different cockpits can be shared in an interactive entertainment process in real time. Therefore, the autonomous vehicle actively collects vehicle internal data through sensors deployed in the cockpit, and can be triggered by other vehicles or road users on the road to share information. Here, the transmitted information can optionally be further processed, as described above, and the description will not be repeated here.

An exemplary third embodiment according to the present disclosure will be described below with reference to FIGS. 6A to 6C. In this embodiment, the autonomous vehicle actively collects the vehicle internal data through the sensors deployed in the cockpit, and transmits the information in a trigger manner, especially in a manner that the autonomous vehicle actively makes triggering.

Figure 6A:
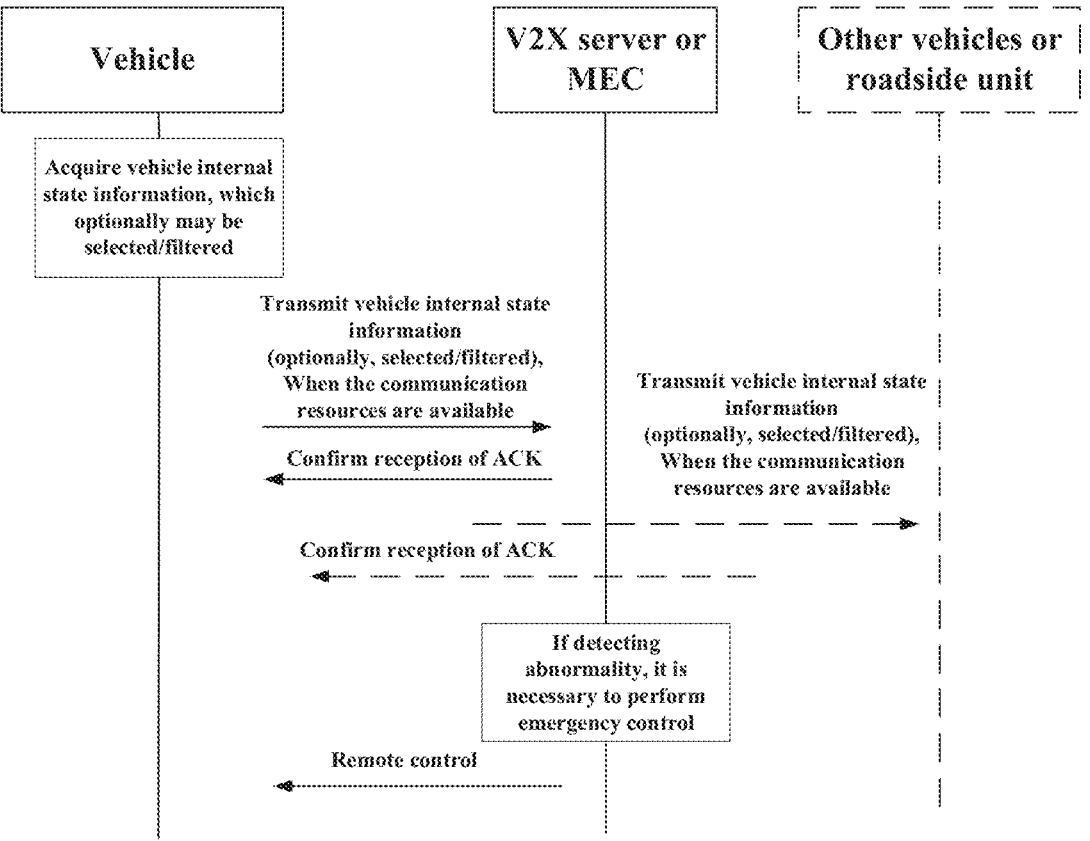
FIGS. 6A to 6C illustrate signaling interaction flows according to a third embodiment of the present disclosure.

FIG. 6A shows information transmission in the resource trigger mode according to this embodiment. Particularly, the autonomous vehicle decides the transmission opportunity by judging the current status of available resources. As an example, when the autonomous vehicle finds that the resources are available, information transmission is triggered, and the information can be transmitted to V2X server or MEC, or roadside units or other vehicles in the system.

Figure 6B:
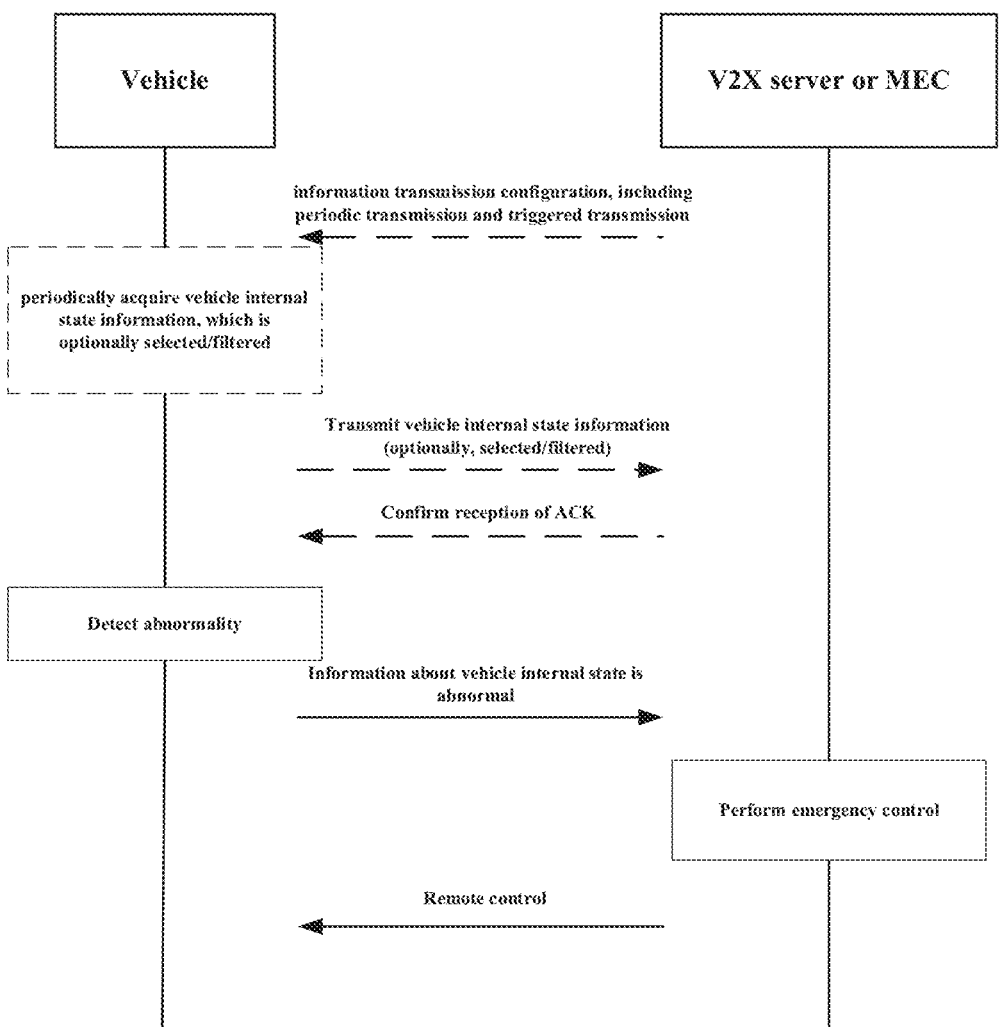

FIG. 6B shows information transmission in the event trigger mode according to this embodiment. Particularly, the autonomous vehicle decides the transmission opportunity by analyzing/judging the collected information. As an example, when the autonomous vehicle determines that there exists an abnormality by analyzing/judging the collected information, the information transmission is triggered, and the information can be transmitted to the V2X server or MEC, so that the V2X server or MEC can remotely control the vehicle and effectively suppress the occurrence of danger.

Figure 6C:
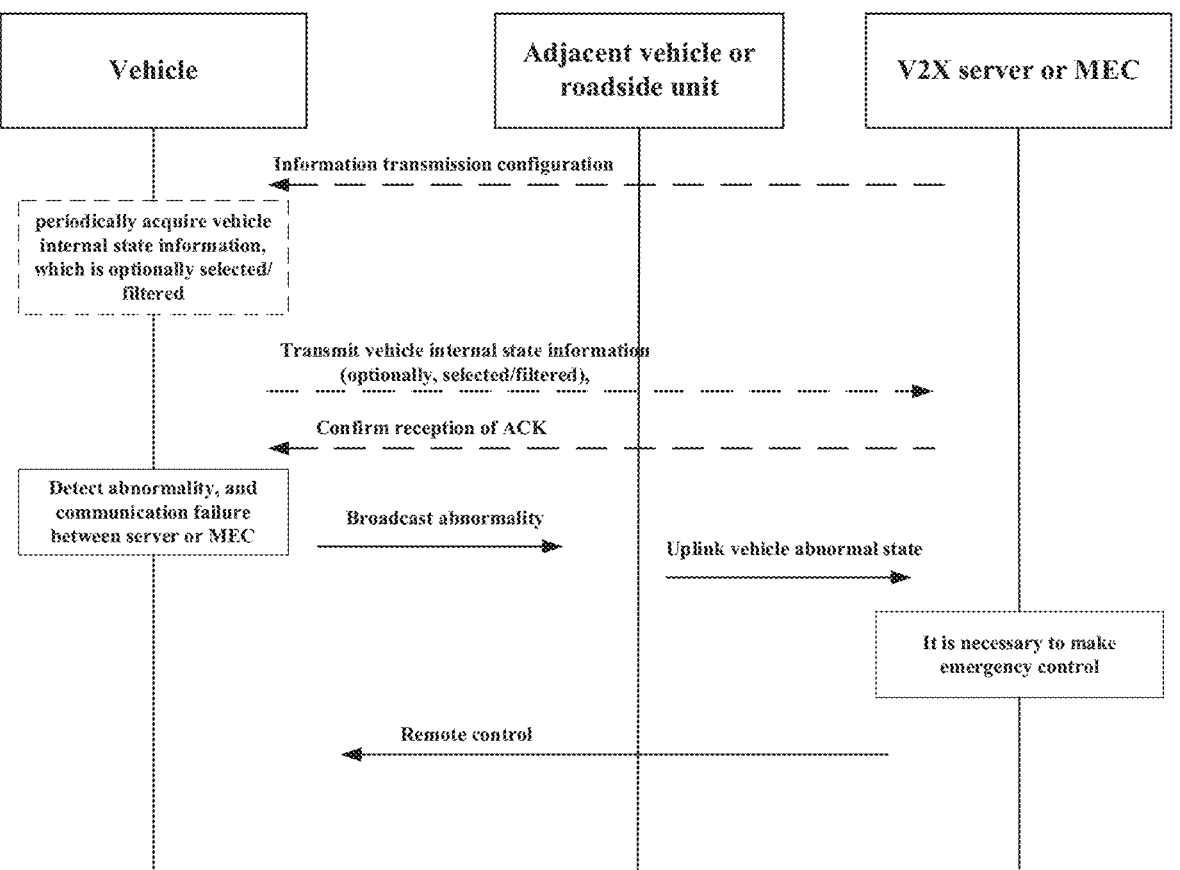

FIG. 6C shows information transmission in the event trigger mode, and particularly, detected content broadcast/multicast in the event of emergency or non-coverage, according to this embodiment. Among them, when the autonomous vehicle determines that there exists an abnormality by analyzing/judging the collected information, the current vehicle communication condition is poor, such as out of the network coverage, the communication with V2X server or MEC is out of order, and so on, the autonomous vehicle actively broadcasts the detected abnormal vehicle internal state information to vehicles on the surrounding roads. Therefore, the adjacent vehicles can know the condition and information of the abnormal vehicles in time, and forward the information to the server, MEC, roadside equipments, etc. in V2X in time, so that the adjacent vehicles can make avoidance in time, and the server can know the vehicle internal failure in time, and make unified scheduling and deployment.

It should be noted that the triggered transmission and the periodic transmission of this embodiment can be used together. In particular, the vehicle internal state information can be transmitted periodically in general, and the triggered transmission can be performed when the condition of event trigger or resource trigger are met. In addition, the transmitted information can optionally be further processed, as described above, and the description will not be repeated here. In this case, the manner of periodic transmission may be that as shown in FIG. 4A or 4B, and indicated by a dotted line in FIGS. 6A to 6C.

In the scenario of vehicle-to-vehicle (V2V) communication, vehicles with some common interests on the road can cooperatively form a fleet-based driving mode.

Usually, vehicles in a communication system will be arranged in a line or a column to form a fleet. There is usually a header vehicle and several follower vehicles in the vehicle fleet. In the application scenario of vehicle fleet, the header vehicle communicates with all follower vehicles by appropriate communication manner, such as any one or more of broadcast, multicast and unicast. Of course, the communication manner can also be other suitable manner. For example, an application example of information sharing in automatic driving (no matter whether semi-automatic driving or full-automatic driving) can be considered.

Figure 7:
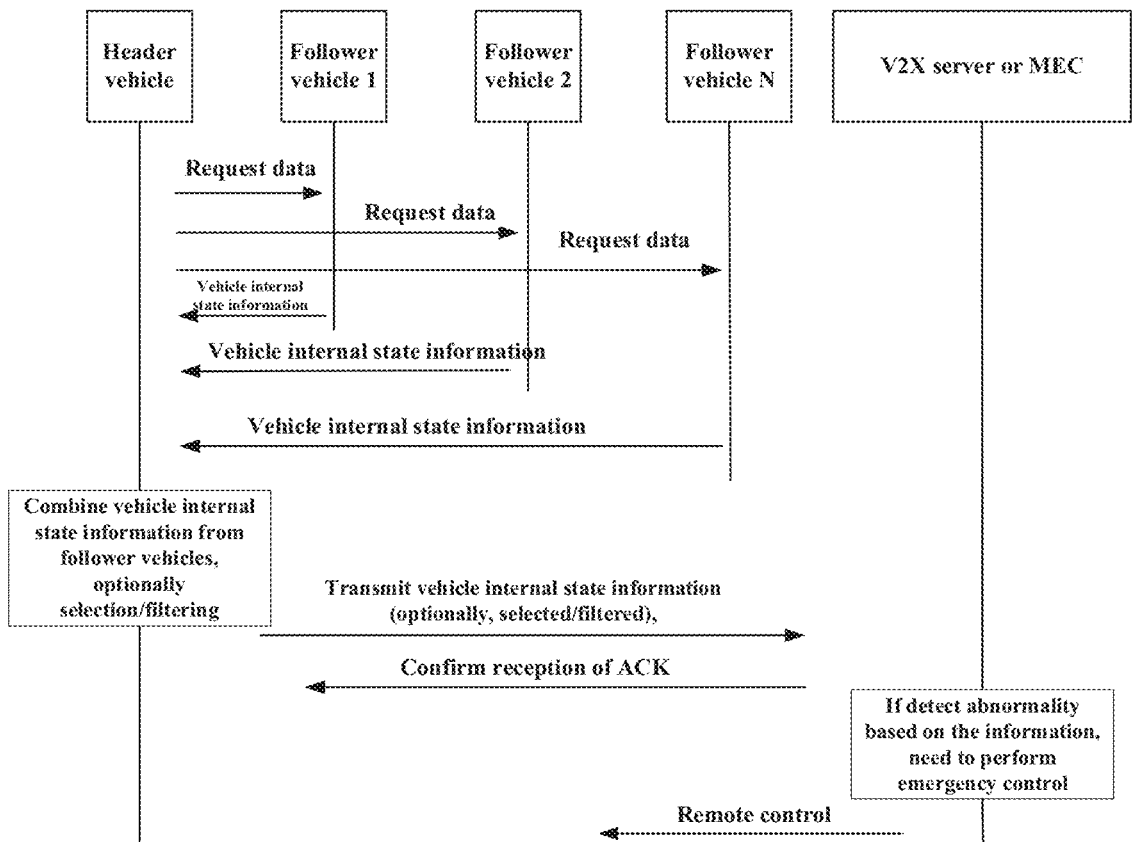
FIG. 7 illustrate a signaling interaction flow according to a fourth embodiment of the present disclosure.

The normal operation of the fleet is mainly realized by the efficient management of the header vehicle, which of course also depends on powerful computing and processing functions of the header vehicle. In the scenario of collecting and sharing intelligent cockpit internal information, the header vehicle naturally becomes the master. The member vehicles will send all their cockpit sensing contents to the header vehicle, of course, on the basis that the header vehicle performs pre-configuration or trigger in real time. After the header vehicle collects the cockpit information from all or part of the vehicle fleet members, the header vehicle will filter the information and share it with V2X server or MEC. In addition, the header vehicle also supports the interaction of cockpit sensing information with the member vehicles in the fleet for immersive in-vehicle entertainment activities. The information interaction flow is shown in FIG. 7, which shows the signaling interaction flow according to the fourth embodiment of the present disclosure.

Among them, the header vehicle sends a request to the follower vehicle 1, the follower vehicle 2, . . . , the follower vehicle N to request the vehicle internal state information of each follower vehicle, receives reports from each follower vehicle, and provides responses. After collecting the cockpit information of all or part of the members of the vehicle fleet, the header vehicle will filter and share it with V2X server or MEC, and receive the response from V2X server or MEC. In addition, if V2X server or MEC confirms that the vehicle state is abnormal according to the vehicle internal state information, emergency control can be started and the vehicle can be remotely controlled through the network.

Application Examples

In this disclosure, an example of communication scenario in V2X is described, but it should be understood that the application scenarios of this disclosure are not limited to the communication scenario in V2X. The improved solution proposed in this disclosure can be applied to any cooperative communication application scenario, such as UAV formation flight, intelligent factory robot cooperative operation, etc.

It should be noted that the above description is only exemplary. The disclosed embodiments can also be executed in any other appropriate way, and still achieve the advantageous effects obtained by the embodiments according to the present disclosure. Furthermore, the embodiments of the present disclosure can also be applied to other similar application instances, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory vehicled, a memory stick, and the like.

Figure 8:
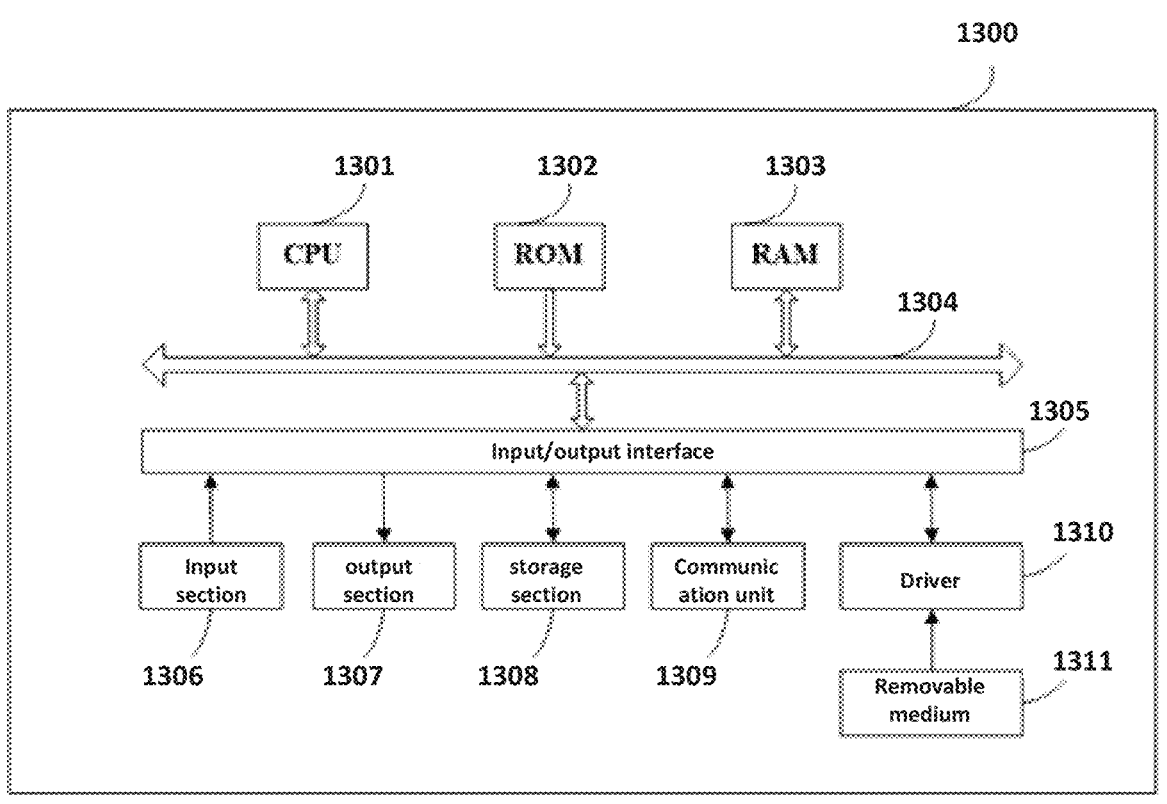
FIG. 8 schematically illustrates a block diagram of an exemplary structure of a personal computer as an information processing device that can be employed in an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1300 shown in FIG. 8, and the computer can perform a variety of functions by installing various programs thereon. FIG. 8 is a block diagram illustrating an example structure of a personal computer as an information processing apparatus that can be adopted in an embodiment of the present disclosure. In one example, the personal computer may correspond to the above-described exemplary transmitting device or terminal-side electronic device according to the present disclosure.

In FIG. 8, a central processing unit (CPU) 1301 performs various processes according to a program stored in a read only memory (ROM) 1302 or a program loaded from a storage section 1308 to a random-access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: an input section 1306 including a keyboard, a mouse, etc.; an output section 1307 including a display, such as a cathode ray tube (CRT), a liquid crystal display (LCD), etc., and a speaker, etc.; a storage section 1308 including hard disks, etc.; and communication section 1309 including network interface vehicleds such as LAN vehicleds, modems, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 8 in which the program is stored and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 1302, a hard disk included in the storage section 1308, and the like, in which programs are stored and which are distributed to users along with the device containing them.

The technology of the present disclosure can be applied to various products.

For example, the control-side electronic devices according to embodiments of the present disclosure can be implemented as a variety of control devices/base stations, or be included therein. For example, the transmitting-side electronic device and/or terminal electronic device according to embodiments of the present disclosure can be implemented as a variety of terminal devices or be included in a variety of terminal devices.

For example, the transmitting-side electronic device/base stations mentioned in this disclosure can be implemented as any type of base station, for example, evolved Node B (eNB), such as macro eNB and small eNB. A small eNB may be an eNB covering a cell smaller than a macro cell, such as a pico eNB, a micro eNB, and a home (femto) eNB. Furthermore, for example, the transmitting-side electronic device/base stations can be implemented as gNB, such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, in some embodiments, the terminal device mentioned in this disclosure can be implemented as a mobile terminal such as a smart phone, a tablet personal computer (PC), a notebook PC, a portable gaming terminal, a portable/dongle Mobile routers and digital cameras, or vehicle terminals such as vehicle navigation equipment. The terminal device can also be implemented as a terminal that performs machine-to-machine (M2M) communication, also called as a machine type communication (MTC) terminal. In addition, the terminal device may be a wireless communication module mounted on each of the terminals described above, such as an integrated circuit module including a single chip.

Examples according to the present disclosure will be described below with reference to the figures.

[Example of Base Station]

It should be understood that the term "base station" in this disclosure has the full breadth of its usual meaning and includes at least a wireless communication station that is used as part of a wireless communication system or radio system for communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE eNB, etc that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 9:
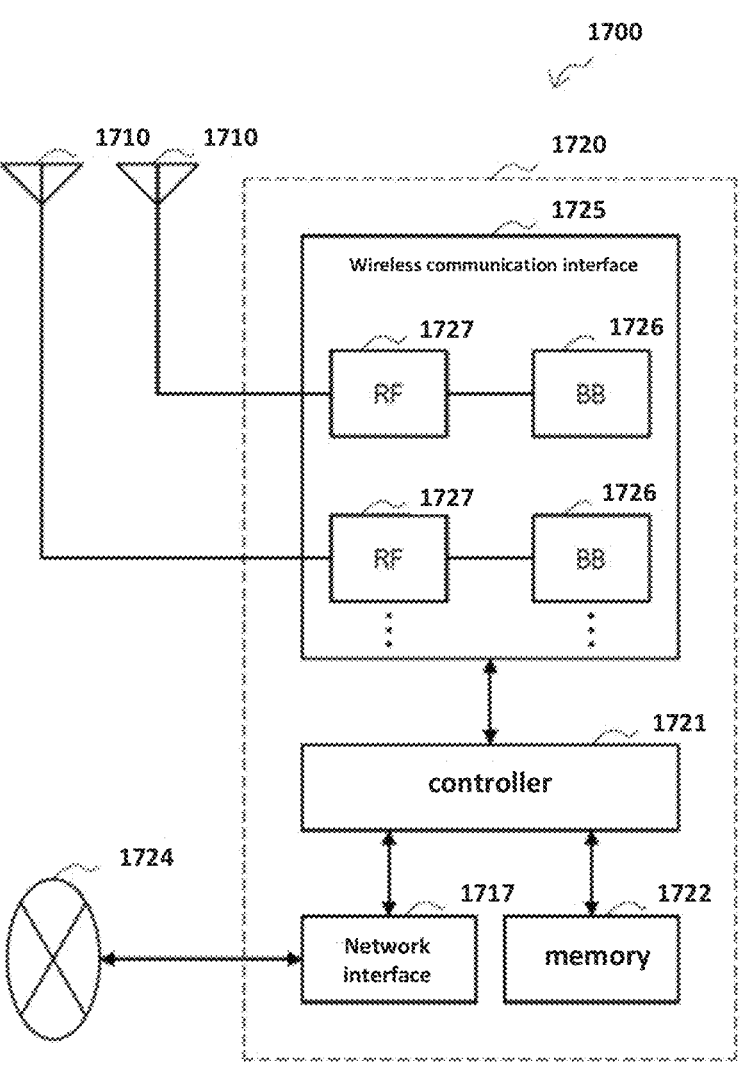
FIG. 9 is a block diagram illustrating a first example of a schematic configuration of an eNB to which the technology of the present disclosure can be applied.

FIG. 9 is a block diagram illustrating a first example of a schematic configuration of a gNB to which the technology of the present disclosure can be applied. The gNB 1700 includes a plurality of antennas 1710 and a base station device 1720. The base station device 1720 and each antenna 1710 may be connected to each other via an RF cable. In an implementation manner, the gNB 1700 (or the base station device 1720) herein may correspond to the above-mentioned transmitting-side and/or receiving-side electronic device.

Each of the antennas 1710 includes a single or multiple antenna elements, such as multiple antenna elements included in a multiple-input multiple-output (MIMO) antenna, and is used for the base station device 1720 to transmit and receive wireless signals. As shown in FIG. 9, the gNB 1700 may include a plurality of antennas 1710. For example, multiple antennas 1710 may be compatible with multiple frequency bands used by gNB 1700.

The base station device 1720 includes a controller 1721, a memory 1722, a network interface 1717, and a wireless communication interface 1725.

The controller 1721 may be, for example, a CPU or a DSP, and operates various functions of the base station device 1720 at a higher layer. For example, the controller 1721 determines position information about a target terminal device in at least one terminal device on the terminal side of a wireless communication system based on the location information and specific position configuration information about the at least one terminal device acquired via a wireless communication interface 1725. The controller 1721 may have logical functions that perform controls such as radio resource control, radio bearer control, mobility management, admission control, and scheduling. The controls can be performed in conjunction with a nearby gNB or core network node. The memory 1722 includes a RAM and a ROM, and stores a program executed by the controller 1721 and various types of control data such as a terminal list, transmission power data, and scheduling data.

The network interface 1717 is a communication interface for connecting the base station device 1720 to the core network 1724. The controller 1721 may communicate with a core network node or another gNB via the network interface 1717. In this case, the gNB 1700 and the core network node or other gNBs may be connected to each other through a logical interface such as an S1 interface and an X2 interface. The network interface 1717 may also be a wired communication interface or a wireless communication interface for a wireless backhaul line. If the network interface 1717 is a wireless communication interface, compared with the frequency band used by the wireless communication interface 1725, the network interface 1717 can use a higher frequency band for wireless communication.

The wireless communication interface 1725 supports any cellular communication scheme such as Long Term Evolution (LTE) and LTE-Advanced, and provides a wireless connection to a terminal located in a cell of the gNB 1700 via an antenna 1710. The wireless communication interface 1725 may generally include, for example, a baseband (BB) processor 1726 and an RF circuit 1727. The BB processor 1726 may perform, for example, encoding/decoding, modulation/demodulation, and multiplexing/demultiplexing, and execute various types of signal processing in layers such as L1, Medium Access Control (MAC), Radio Link Control (RLC), and Group Data Convergence Protocol (PDCP). As an alternative of the controller 1721, the BB processor 1726 may have a part or all of the above-mentioned logical functions. The BB processor 1726 may be a memory storing a communication control program, or a module including a processor and related circuits configured to execute the program. Updating the program can change the function of the BB processor 1726. The module may be a vehicled or a blade inserted into a slot of the base station device 1720. Alternatively, the module may be a chip mounted on a vehicled or a blade. Meanwhile, the RF circuit 1727 may include, for example, a mixer, a filter, and an amplifier, and transmits and receives a wireless signal via the antenna 1710. Although FIG. 9 illustrates an example in which one RF circuit 1727 is connected to one antenna 1710, the present disclosure is not limited to this illustration, but one RF circuit 1727 may be connected to multiple antennas 1710 at the same time.

As shown in FIG. 9, the wireless communication interface 1725 may include a plurality of BB processors 1726. For example, the plurality of BB processors 1726 may be compatible with multiple frequency bands used by gNB 1700. As shown in FIG. 9, the wireless communication interface 1725 may include a plurality of RF circuits 1727. For example, the plurality of RF circuits 1727 may be compatible with multiple antenna elements. Although FIG. 9 illustrates an example in which the wireless communication interface 1725 includes a plurality of BB processors 1726 and a plurality of RF circuits 1727, the wireless communication interface 1725 may also include a single BB processor 1726 or a single RF circuit 1727.

Second Example

Figure 10:
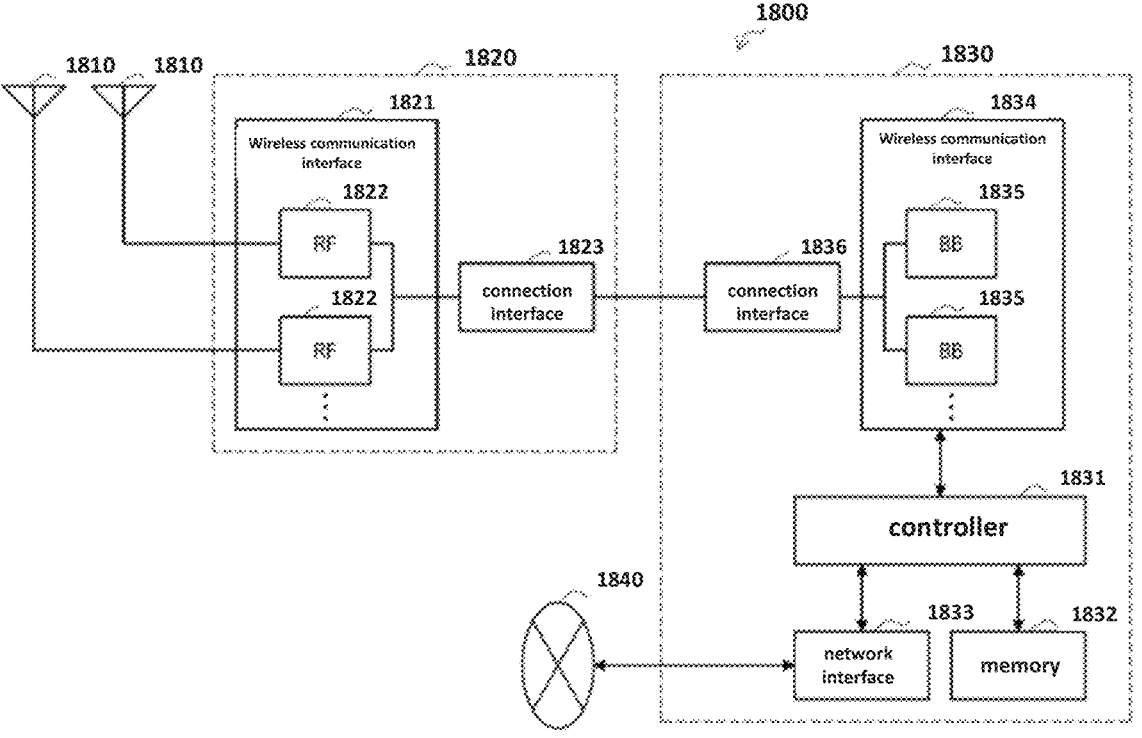
FIG. 10 is a block diagram illustrating a second example of a schematic configuration of an eNB to which the technology of the present disclosure can be applied.

FIG. 10 is a block diagram illustrating a second example of a schematic configuration of a gNB to which the technology of the present disclosure can be applied. The gNB 1800 includes multiple antennas 1810, RRH 1820 and base station equipment 1830. The RRH 1820 and each antenna 1810 may be connected to each other via an RF cable. The base station equipment 1830 and the RRH 1820 may be connected to each other via a high-speed line such as a fiber optic cable. In an implementation manner, the gNB 1800 (or the base station equipment 1830) herein may correspond to the foregoing transmitting-side and/or receiving-side electronic device.

Each of the antennas 1810 includes a single or multiple antenna elements (such as multiple antenna elements included in a MIMO antenna) and is used for RRH 1820 to transmit and receive wireless signals. As shown in FIG. 10, the gNB 1800 may include multiple antennas 1810. For example, multiple antennas 1810 may be compatible with multiple frequency bands used by gNB 1800.

The base station device 1830 includes a controller 1831, a memory 1832, a network interface 1833, a wireless communication interface 1834, and a connection interface 1836. The controller 1831, the memory 1832, and the network interface 1833 are the same as the controller 1721, the memory 1722, and the network interface 1717 described with reference to FIG. 9.

The wireless communication interface 1834 supports any cellular communication scheme such as LTE and LTE-Advanced, and provides wireless communication to a terminal located in a sector corresponding to the RRH 1820 via the RRH 1820 and the antenna 1810. The wireless communication interface 1834 may typically include, for example, a BB processor 1835. The BB processor 1835 is the same as the BB processor 1726 described with reference to FIG. 9 except that the BB processor 1835 is connected to the RF circuit 1822 of the RRH 1820 via the connection interface 1836. As shown in FIG. 10, the wireless communication interface 1834 may include a plurality of BB processors 1835. For example, multiple BB processors 1835 may be compatible with multiple frequency bands used by gNB 1800. Although FIG. 10 illustrates an example in which the wireless communication interface 1834 includes a plurality of BB processors 1835, the wireless communication interface 1834 may also include a single BB processor 1835.

The connection interface 1836 is an interface for connecting the base station device 1830 (wireless communication interface 1834) to the RRH 1820. The connection interface 1836 may also be a communication module for communication in the above-mentioned high-speed line connecting the base station device 1830 (wireless communication interface 1834) to the RRH 1820.

The RRH 1820 includes a connection interface 1823 and a wireless communication interface 1821.

The connection interface 1823 is an interface for connecting the RRH 1820 (wireless communication interface 1821) to the base station device 1830. The connection interface 1823 may also be a communication module for communication in the above-mentioned high-speed line.

The wireless communication interface 1821 transmits and receives wireless signals via the antenna 1810. The wireless communication interface 1821 may generally include, for example, an RF circuit 1822. The RF circuit 1822 may include, for example, a mixer, a filter, and an amplifier, and transmits and receives wireless signals via the antenna 1810. Although FIG. 10 illustrates an example in which one RF circuit 1822 is connected to one antenna 1810, the present disclosure is not limited to this illustration, but one RF circuit 1822 may be connected to multiple antennas 1810 at the same time.

As shown in FIG. 10, the wireless communication interface 1821 may include a plurality of RF circuits 1822. For example, the plurality of RF circuits 1822 may support multiple antenna elements. Although FIG. 10 illustrates an example in which the wireless communication interface 1821 includes a plurality of RF circuits 1822, the wireless communication interface 1821 may include a single RF circuit 1822.

[Example of User Device/Terminal Device]

First Example

Figure 11:
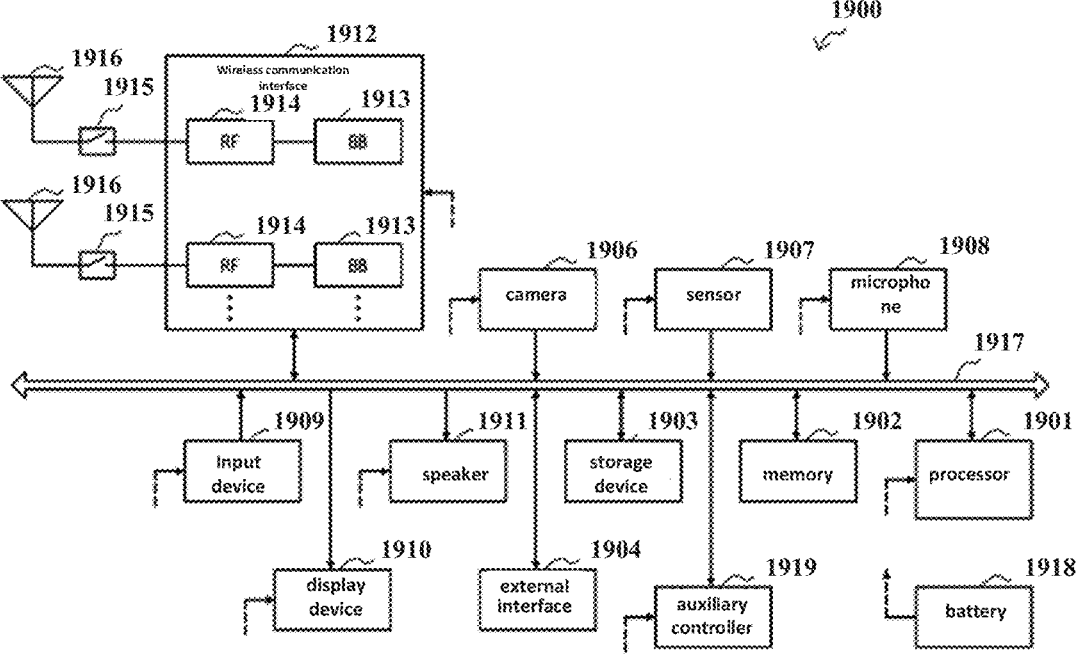
FIG. 11 is a block diagram illustrating an example of a schematic configuration of a smartphone to which the technology of the present disclosure can be applied.

FIG. 11 is a block diagram illustrating an example of a schematic configuration of a communication device 1900, such as smartphone, linker, etc., to which the technology of the present disclosure can be applied. The communication device 1900 includes a processor 1901, a memory 1902, a storage device 1903, an external connection interface 1904, a camera device 1906, a sensor 1907, a microphone 1908, an input device 1909, a display device 1910, a speaker 1911, a wireless communication interface 1912, one or more antenna switches 1915, one or more antennas 1916, a bus 1917, a battery 1918, and an auxiliary controller 1919. In an implementation manner, the communication device 1900 (or the processor 1901) herein may correspond to the foregoing transmitting device or terminal-side electronic device.

The processor 1901 may be, for example, a CPU or a system on chip (SoC), and controls functions of an application layer and another layer of the smartphone 1900. The memory 1902 includes a RAM and a ROM, and stores data and programs executed by the processor 1901. The storage device 1903 may include a storage medium such as a semiconductor memory and a hard disk. The external connection interface 1904 is an interface for connecting external devices such as a memory vehicled and a universal serial bus (USB) device to the smartphone 1900.

The camera device 1906 includes an image sensor such as a charge-coupled device (CCD) and a complementary metal oxide semiconductor (CMOS), and generates a captured image. The sensor 1907 may include a set of sensors such as a measurement sensor, a gyroscope sensor, a geomagnetic sensor, and an acceleration sensor. The microphone 1908 converts a sound input to the smartphone 1900 into an audio signal.

The input device 1909 includes, for example, a touch sensor, a keypad, a keyboard, a button, or a switch configured to detect a touch on the screen of the display device 1910, and receives an operation or information input from a user. The display device 1910 includes a screen such as a liquid crystal display (LCD) and an organic light emitting diode (OLED) display, and displays an output image of the smartphone 1900. The speaker 1911 converts an audio signal output from the smartphone 1900 into a sound.

The wireless communication interface 1912 supports any cellular communication scheme such as LTE and LTE-Advanced, and performs wireless communication. The wireless communication interface 1912 may generally include, for example, a BB processor 1913 and an RF circuit 1914. The BB processor 1913 may perform, for example, encoding/decoding, modulation/demodulation, and multiplexing/demultiplexing, and perform various types of signal processing for wireless communication. Meanwhile, the RF circuit 1914 may include, for example, a mixer, a filter, and an amplifier, and transmits and receives wireless signals via the antenna 1916. The wireless communication interface 1912 may be a chip module on which a BB processor 1913 and an RF circuit 1914 are integrated. As shown in FIG. 11, the wireless communication interface 1912 may include multiple BB processors 1913 and multiple RF circuits 1914. Although FIG. 11 illustrates an example in which the wireless communication interface 1912 includes a plurality of BB processors 1913 and a plurality of RF circuits 1914, the wireless communication interface 1912 may also include a single BB processor 1913 or a single RF circuit 1914.

In addition, in addition to the cellular communication scheme, the wireless communication interface 1912 may support other types of wireless communication scheme, such as a short-range wireless communication scheme, a near field communication scheme, and a wireless local area network (LAN) scheme. In this case, the wireless communication interface 1912 may include a BB processor 1913 and an RF circuit 1914 for each wireless communication scheme.

Each of the antenna switches 1915 switches a connection destination of the antenna 1916 between a plurality of circuits included in the wireless communication interface 1912 (for example, circuits for different wireless communication schemes).

Each of the antennas 1916 includes a single or multiple antenna elements, such as multiple antenna elements included in a MIMO antenna, and is used for the wireless communication interface 1912 to transmit and receive wireless signals. As shown in FIG. 11, the smartphone 1900 may include a plurality of antennas 1916. Although FIG. 11 illustrates an example in which the smart phone 1900 includes a plurality of antennas 1916, the smart phone 1900 may also include a single antenna 1916.

In addition, the smartphone 1900 may include an antenna 1916 for each wireless communication scheme. In this case, the antenna switch 1915 may be omitted from the configuration of the smartphone 1900.

The bus 1917 connects the processor 1901, the memory 1902, the storage device 1903, the external connection interface 1904, the camera device 1906, the sensor 1907, the microphone 1908, the input device 1909, the display device 1910, the speaker 1911, the wireless communication interface 1912, and the auxiliary controller 1919 to each other. The battery 1918 supplies power to each block of the smartphone 1900 shown in FIG. 11 via a feeder, and the feeder is partially shown as a dotted line in the figure. The auxiliary controller 1919 operates the minimum necessary functions of the smartphone 1900 in the sleep mode, for example.

Second Example

Figure 12:
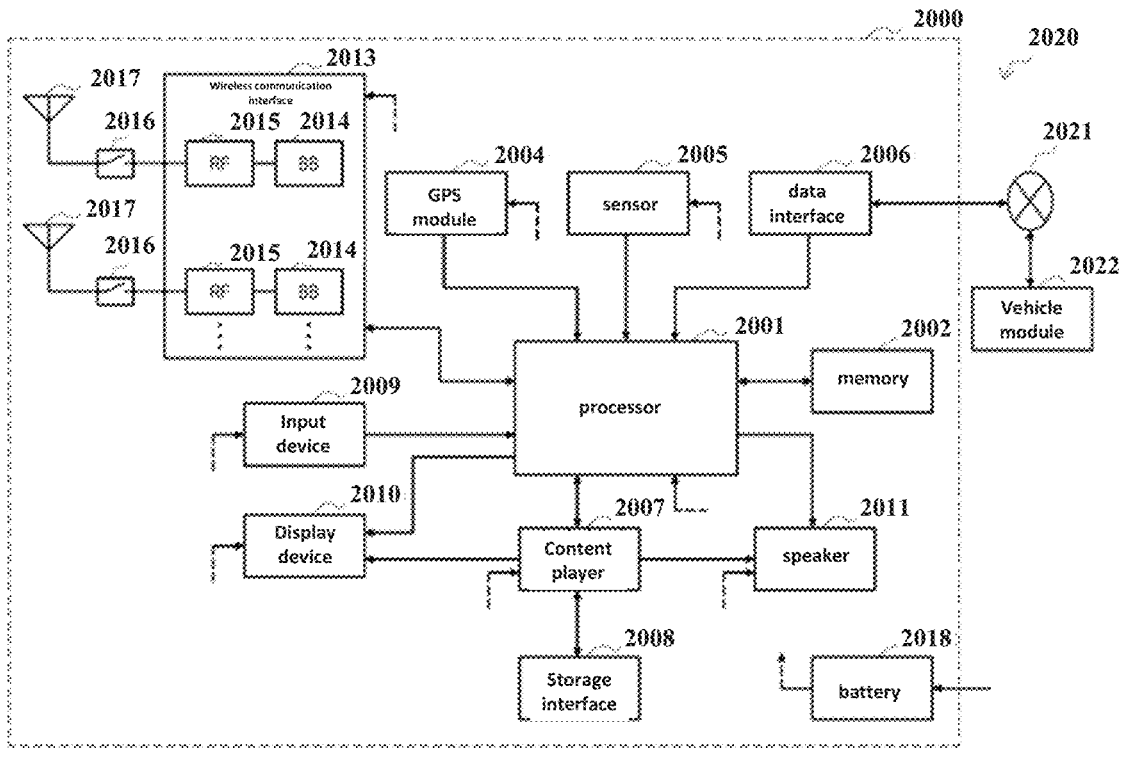
FIG. 12 is a block diagram illustrating an example of a schematic configuration of a vehicle navigation device to which the technology of the present disclosure can be applied.

FIG. 12 is a block diagram illustrating an example of a schematic configuration of a vehicle navigation device 2000 to which the technology of the present disclosure can be applied. The vehicle navigation device 2000 includes a processor 2001, a memory 2002, a global location system (GPS) module 2004, a sensor 2005, a data interface 2006, a content player 2007, a storage medium interface 2008, an input device 2009, a display device 2010, a speaker 2011, and a wireless communication interface 2013, one or more antenna switches 2016, one or more antennas 2017, and a battery 2018. In an implementation manner, the vehicle navigation device 2000 (or the processor 2001) herein may correspond to the transmitting device or terminal-side electronic device.

The processor 2001 may be, for example, a CPU or a SoC, and controls navigation functions and other functions of the vehicle navigation device 2000. The memory 2002 includes a RAM and a ROM, and stores data and programs executed by the processor 2001.

The GPS module 2004 uses a GPS signal received from a GPS satellite to measure the position (such as latitude, longitude, and altitude) of the vehicle navigation device 2000. The sensor 2005 may include a set of sensors such as a gyroscope sensor, a geomagnetic sensor, and an air pressure sensor. The data interface 2006 is connected to, for example, an in-vehicle network 2021 via a terminal not shown, and acquires data (such as vehicle speed data) generated by the vehicle.

The content player 2007 reproduces content stored in a storage medium such as a CD and a DVD, which is inserted into the storage medium interface 2008. The input device 2009 includes, for example, a touch sensor, a button, or a switch configured to detect a touch on the screen of the display device 2010, and receives an operation or information input from a user. The display device 2010 includes a screen such as an LCD or OLED display, and displays an image of a navigation function or reproduced content. The speaker 2011 outputs the sound of the navigation function or the reproduced content.

The wireless communication interface 2013 supports any cellular communication scheme such as LTE and LTE-Advanced, and performs wireless communication. The wireless communication interface 2013 may generally include, for example, a BB processor 2014 and an RF circuit 2015. The BB processor 2014 may perform, for example, encoding/decoding, modulation/demodulation, and multiplexing/demultiplexing, and perform various types of signal processing for wireless communication. Meanwhile, the RF circuit 2015 may include, for example, a mixer, a filter, and an amplifier, and transmit and receive wireless signals via the antenna 2017. The wireless communication interface 2013 may also be a chip module on which a BB processor 2014 and an RF circuit 2015 are integrated. As shown in FIG. 12, the wireless communication interface 2013 may include a plurality of BB processors 2014 and a plurality of RF circuits 2015. Although FIG. 12 illustrates an example in which the wireless communication interface 2013 includes a plurality of BB processors 2014 and a plurality of RF circuits 2015, the wireless communication interface 2013 may also include a single BB processor 2014 or a single RF circuit 2015.

In addition, in addition to the cellular communication scheme, the wireless communication interface 2013 may support other types of wireless communication scheme, such as a short-range wireless communication scheme, a near field communication scheme, and a wireless LAN scheme. In this case, the wireless communication interface 2013 may include a BB processor 2014 and an RF circuit 2015 for each wireless communication scheme.

Each of the antenna switches 2016 switches the connection destination of the antenna 2017 between a plurality of circuits included in the wireless communication interface 2013, such as circuits for different wireless communication schemes.

Each of the antennas 2017 includes a single or multiple antenna element, such as multiple antenna elements included in a MIMO antenna, and is used for the wireless communication interface 2013 to transmit and receive wireless signals. As shown in FIG. 12, the vehicle navigation device 2000 may include a plurality of antennas 2017. Although FIG. 12 illustrates an example in which the vehicle navigation device 2000 includes a plurality of antennas 2017, the vehicle navigation device 2000 may also include a single antenna 2017.

In addition, the vehicle navigation device 2000 may include an antenna 2017 for each wireless communication scheme. In this case, the antenna switch 2016 may be omitted from the configuration of the vehicle navigation device 2000.

The battery 2018 supplies power to each block of the vehicle navigation device 2000 shown in FIG. 12 via a feeder, and the feeder is partially shown as a dotted line in the figure. The battery 2018 accumulates power provided from the vehicle.

The technology of the present disclosure may also be implemented as a vehicle on-board system (or vehicle) 2020 including one or more of a vehicle navigation device 2000, an in-vehicle network 2021, and a vehicle module 2022. The vehicle module 2022 generates vehicle data such as vehicle speed, engine speed, and failure information, and outputs the generated data to the in-vehicle network 2021.

The exemplary embodiments of the present disclosure have been described above with reference to the drawings, but the present disclosure is of course not limited to the above examples. Those skilled in the art may find various alternations and modifications within the scope of the appended claims, and it should be understood that they will naturally fall in the technical scope of the present disclosure.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

In addition, it should be understood that the processes and devices described above may also be implemented by software and/or firmware. In the case of implementation by software and/or firmware, corresponding programs consti-tuting the corresponding software are stored in the storage medium of the related device, and the programs, when executed, can perform various functions.

For example, a plurality of functions included in one unit in the above embodiment can be realized by separate devices. Alternatively, a plurality of functions included in one unit in the above embodiments may be respectively realized by separate devices. In addition, one of the above functions can be realized by multiple units, and such a configuration is also included in the technical scope of this disclosure.

In this specification, the steps described in the flowchart include not only the processes that are executed in time series in the stated order, but also the processes that are executed in parallel or solely instead of necessarily in time series. In addition, even in the step of processing in time series, needless to say, the order can be appropriately changed.

Exemplary embodiment implementation of the present disclosure

According to embodiments of the present disclosure, various exemplary embodiments (EE) for implementing the concept of the present disclosure can be conceived, com-prising, but not limited to:

EE 1. A terminal-side electronic device in a wireless communication system, including a processing circuit configured to:

acquire information about an internal state of a termi-nal-side device associated with the terminal-side electronic device, and transmit the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

EE 2. The electronic device of EE 1, wherein the terminal-side electronic device is a vehicle in a Vehicle to Everything system, and the information about the inter-nal state of the terminal-side device includes informa-tion about vehicle internal state.

EE 3. The electronic device of EE 2, wherein the infor-mation about the vehicle internal state includes infor-mation about vehicle driver status, including informa-tion about at least one of:

orientation of driver's sight, orientation of driver's head, position of driver's hands, driver's health status (heart rate, breathing, etc.), whether the driver is sleepy, whether the driver is too excited, and whether the driver is inattentive.

EE 4. The electronic device of EE 2, wherein the infor-mation about the vehicle internal state includes infor-mation about vehicle passenger status, including infor-mation about at least one of:

passenger's facial expression, passenger's health, pas-senger's vital signs.

EE 5. The electronic device of EE 2, wherein the infor-mation about the vehicle internal state includes infor-mation about vehicle internal equipment status includ-ing information about at least one of:

whether the windshield is damaged, whether the sky-light is damaged, whether the window is damaged, and whether the air conditioner in the vehicle works normally.

EE 6. The electronic device of EE 2, wherein the infor-mation about the vehicle internal state is filtered infor-mation after removing non-safety information from the information about the vehicle internal state acquired by a vehicle internal sensor.

EE 7. The electronic device of EE 2, wherein the trigger mode comprises resource trigger, and wherein the processing circuit is further configured to:

perform information transmission in accordance with a condition of communication resource availability, wherein the processing circuit performs information transmission, when a control-side device in the wire-less communication system indicates that communi-cation resources are available, or the vehicle detects that communication resources are available.

EE 8. The electronic device of EE 2, wherein the trigger mode comprises event trigger, and wherein the pro-cessing circuit is further configured to:

perform information transmission when a specific event condition is satisfied, wherein the specific event condition includes at least one of a request from a control-side device in the wireless communication system and a judgment that there exists abnormality based on acquired informa-tion.

EE 9. The electronic device of EE 2, wherein the pro-cessing circuit actively broadcasts the detected infor-mation about the vehicle internal abnormal state to a neighboring vehicle or a roadside unit when it is judged that there exists abnormality based on the acquired information and the vehicle is not within a network coverage range.

EE 10. The electronic device of EE 2, wherein the vehicle is a header vehicle in a vehicle fleet, and the processing circuit is further configured to:

collect information of follower vehicles in the fleet, and transmit the information of the vehicle itself together with the collected information of the follower vehicles.

EE 11. The electronic device of EE 1, wherein the vehicle is a follower vehicle in a vehicle fleet, and the processing circuit is further configured to:

transmit the information about vehicle internal state to a head device in the vehicle fleet periodically or in a trigger mode.

EE 12. A method for a terminal side in a wireless communication system, comprising:

acquiring information about an internal state of a terminal-side device associated with the terminal-side electronic device, and transmitting the information about the internal state of the terminal-side device to another device in the wireless communication system periodically or in a trigger mode, wherein, once information about an abnormal internal state of the terminal-side device is acquired, the information about the abnormal internal state of the terminal-side device is actively broadcasted to a surrounding communicable terminal-side electronic device.

EE 13. The method of EE 12, wherein the terminal-side electronic device is a vehicle in a Vehicle to Everything system, and the information about the internal state of the terminal-side device includes information about vehicle internal state.

EE 14. The method of EE 13, wherein the information about the vehicle internal state includes information about vehicle driver status, including information about at least one of:

orientation of driver's sight, orientation of driver's head, position of driver's hands, driver's health status (heart rate, breathing, etc.), whether the driver is sleepy, whether the driver is too excited, and whether the driver is inattentive.

EE 15. The method of EE 13, wherein the information about the vehicle internal state includes information about vehicle passenger status, including information about at least one of:

passenger's facial expression, passenger's health, passenger's vital signs.

EE 16. The method of EE 13, wherein the information about the vehicle internal state includes information about vehicle internal equipment status including information about at least one of:

whether the windshield is damaged, whether the skylight is damaged, whether the window is damaged, and whether the air conditioner in the vehicle works normally.

EE 17. The method of EE 13, wherein the information about the vehicle internal state is filtered information after removing non-safety information from the information about the vehicle internal state acquired by a vehicle internal sensor.

EE 18. The method of EE 12, wherein the trigger mode comprises resource trigger, and wherein the method further comprises:

performing information transmission in accordance with a condition of communication resource availability, wherein the processing circuit performs information transmission, when a control-side device in the wireless communication system indicates that communication resources are available, or the vehicle detects that communication resources are available.

EE 19. The method of EE 12, wherein the trigger mode comprises event trigger, and wherein the method further comprises:

performing information transmission when a specific event condition is satisfied, wherein the specific event condition includes at least one of a request from a control-side device in the wireless communication system and a judgment that there exists abnormality based on acquired information.

EE 20. The method of EE 12, wherein the processing circuit actively broadcasts the detected information about the vehicle internal abnormal state to a neighboring vehicle or a roadside unit when it is judged that there exists abnormality based on the acquired information and the vehicle is not within a network coverage range.

EE 21. The method of EE 12, wherein the vehicle is a header vehicle in a vehicle fleet, and the method further comprises:

collecting information of follower vehicles in the fleet, and transmitting the information of the vehicle itself together with the collected information of the follower vehicles.

EE 22. The method of EE 12, wherein the vehicle is a follower vehicle in a vehicle fleet, and the method further comprises:

transmitting the information about vehicle internal state to a head device in the vehicle fleet periodically or in a trigger mode.

EE 23. A device comprising at least one processor; and at least one storage device that stores instructions thereon that, when executed by the at least one processor, cause the at least one processor to execute the method of any one of EEs 12 to 22.

EE 24. A storage medium storing instructions which, when executed by a processor, cause execution of the method of any one of EEs 12 to 22.

EE 25. An apparatus comprising means for performing the method of any one of EEs 12 to 22.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

Although some specific embodiments of the present disclosure have been described in detail, those skilled in the art should understand that the above-described embodiments are merely illustrative and do not limit the scope of the present disclosure. Those skilled in the art should understand that the above-described embodiments may be combined, modified, or replaced without departing from the scope and essence of the present disclosure. The scope of the present disclosure is defined by the appended claims.

What is claimed is:

1. A terminal-side electronic device in a wireless communication system, the terminal-side electronic device comprising:

a processing circuit configured to:

acquire information about an internal state of a terminal-side device associated with the terminal-side electronic device, the information about the internal state of the terminal-side device including information about vehicle internal state, the information about the vehicle internal state including (i) information about vehicle driver status, (ii) information about vehicle passenger status, and (iii) information about vehicle internal equipment status, (i) the information about vehicle driver status includes information about at least one of (a) an orientation of a driver's sight, (b) an orientation of the driver's head, (c) a position of the driver's hands, (d) the driver's health status, (e) whether the driver is sleepy, (f) whether the driver is too excited, or (g) whether the driver is inattentive, (ii) the information about vehicle passenger status includes information about at least one of (a) a passenger's facial expression, (b) the passenger's health, or (c) the passenger's vital signs, and (iii) the information about vehicle internal equipment status includes information about at least one of (a) whether a windshield is damaged, (b) whether a skylight is damaged, (c) whether a window is damaged, or (d) whether an air conditioner in the vehicle works normally, transmit the information about the internal state of the terminal-side device to another device in the wireless communication system periodically and in a trigger mode, and in response to information about an abnormal internal state of the terminal-side device being acquired, actively broadcast the information about the abnormal internal state of the terminal-side device to a surrounding communicable terminal-side electronic device.

2. The electronic device of claim 1, wherein the terminal-side electronic device is a vehicle in a Vehicle to Everything system.

3. The electronic device of claim 2, wherein the information about the vehicle internal state is filtered information after removing non-safety information from the information about the vehicle internal state acquired by a vehicle internal sensor.

4. The electronic device of claim 3, wherein the filtering of the information comprises performing feature extraction on a captured image of a driver to generate a virtualized facial expression.

5. The electronic device of claim 2, wherein the trigger mode comprises at least one of a resource trigger or an event trigger, in a case of the resource trigger, the processing circuit is further configured to perform information transmission in accordance with a condition of communication resource availability, including performing the information transmission when a control-side device in the wireless communication system indicates that communication resources are available or the vehicle detects that the communication resources are available, and in a case of the event trigger, the processing circuit is further configured to perform information transmission when a specific event condition is satisfied, the specific event condition including at least one of a request from a control-side device in the wireless communication system or a judgment that there exists an abnormality based on acquired information.

6. The electronic device of claim 2, wherein the processing circuit actively broadcasts the information about the vehicle internal abnormal state to a neighboring vehicle or a roadside unit when it is judged that there exists an abnormality based on the acquired information and the vehicle is not within a network coverage range.

7. The electronic device of claim 2, wherein the vehicle is a header vehicle in a vehicle fleet, and the processing circuit is further configured to:

collect information of follower vehicles in the fleet, and transmit the acquired information as information of the vehicle itself together with the collected information of the follower vehicles.

8. The electronic device of claim 2, wherein the vehicle is a follower vehicle in a vehicle fleet, and the processing circuit is further configured to:

transmit the information about vehicle internal state to a header device in the vehicle fleet periodically er in aand in the trigger mode.

9. The electronic device of claim 1, wherein the information about vehicle passenger status includes a surveillance result for a life presence check of a child within the terminal-side device.

10. A method for a terminal side in a wireless communication system, comprising:

acquiring information about an internal state of a terminal-side device associated with the terminal-side electronic device, the information about the internal state of the terminal-side device including information about vehicle internal state, the information about the vehicle internal state including (i) information about vehicle driver status, (ii) information about vehicle passenger status, and (iii) information about vehicle internal equipment status, (i) the information about vehicle driver status includes information about at least one of (a) an orientation of a driver's sight, (b) an orientation of the driver's head, (c) a position of the driver's hands, (d) the driver's health status, (e) whether the driver is sleepy, (f) whether the driver is too excited, or (g) whether the driver is inattentive, (ii) the information about vehicle passenger status includes information about at least one of (a) a passenger's facial expression, (b) the passenger's health, or (c) the passenger's vital signs, and (iii) the information about vehicle internal equipment status includes information about at least one of (a) whether a windshield is damaged, (b) whether a skylight is damaged, (c) whether a window is damaged, or (d) whether an air conditioner in the vehicle works normally, transmitting the information about the internal state of the terminal-side device to another device in the wireless communication system periodically and in a trigger mode, and in response to information about an abnormal internal state of the terminal-side device being acquired, actively broadcasting the information about the abnormal internal state of the terminal-side device to a surrounding communicable terminal-side electronic device.

11. The method of claim 10, wherein the terminal-side electronic device is a vehicle in a Vehicle to Everything system.

12. The method of claim 11, wherein the information about the vehicle internal state is filtered information after removing non-safety information from the information about the vehicle internal state acquired by a vehicle internal sensor.

13. The method of claim 11, wherein the trigger mode comprises at least one of resource trigger or an event trigger, in a case of the resource trigger, the method further comprises performing information transmission in accordance with a condition of communication resource availability, including performing the information transmission when a control-side device in the wireless communication system indicates that communication resources are available or the vehicle detects that the communication resources are available, and in a case of the event trigger, the method further comprises performing information transmission when a specific event condition is satisfied, the specific event condition including at least one of a request from a control-side device in the wireless communication system or a judgment that there exists an abnormality based on acquired information.

14. The method of claim 11, wherein the method further comprises actively broadcasting the information about the vehicle internal abnormal state to a neighboring vehicle or a roadside unit when it is judged that there exists an abnormality based on the acquired information and the vehicle is not within a network coverage range.

15. The method of claim 11, wherein the vehicle is a header vehicle in a vehicle fleet, and the method further comprises:

collecting information of follower vehicles in the fleet, and transmitting the acquired information as information of the vehicle itself together with the collected information of the follower vehicles.

16. The method of claim 11, wherein the vehicle is a follower vehicle in a vehicle fleet, and the method further comprises:

transmitting the information about vehicle internal state to a header device in the vehicle fleet periodically and in the trigger mode.

17. A non-transitory computer-readable storage medium storing executable instructions which, when executed by a processor, cause the processor to implement a method, the method comprising:

acquiring information about an internal state of a terminal-side device associated with a terminal-side electronic device, the information about the internal state of the terminal-side device including information about vehicle internal state, the information about the vehicle internal state including (i) information about vehicle driver status, (ii) information about vehicle passenger status, and (iii) information about vehicle internal equipment status, (i) the information about vehicle driver status includes information about at least one of (a) an orientation of a driver's sight, (b) an orientation of the driver's head, (c) a position of the driver's hands, (d) the driver's health status, (e) whether the driver is sleepy, (f) whether the driver is too excited, or (g) whether the driver is inattentive, (ii) the information about vehicle passenger status includes information about at least one of (a) a passenger's facial expression, (b) the passenger's health, or (c) the passenger's vital signs, and (iii) the information about vehicle internal equipment status includes information about at least one of (a) whether a windshield is damaged, (b) whether a skylight is damaged, (c) whether a window is damaged, or (d) whether an air conditioner in the vehicle works normally, transmitting the information about the internal state of the terminal-side device to another device in the wireless communication system periodically and in a trigger mode, and in response to information about an abnormal internal state of the terminal-side device being acquired, actively broadcasting the information about the abnormal internal state of the terminal-side device to a surrounding communicable terminal-side electronic device.

18. The non-transitory computer-readable storage medium of claim 17, wherein the terminal-side electronic device is a vehicle in a Vehicle to Everything system.

19. The non-transitory computer-readable storage medium of claim 18, wherein the method further comprises:

in a case of a resource trigger, performing information transmission in accordance with a condition of communication resource availability, including performing the information transmission when a control-side device in the wireless communication system indicates that communication resources are available or the vehicle detects that the communication resources are available, in a case of an event trigger, performing information transmission when a specific event condition is satisfied, the specific event condition including at least one of a request from a control-side device in the wireless communication system or a judgment that there exists an abnormality based on acquired information, and actively broadcasting the information about the vehicle internal abnormal state to a neighboring vehicle or a roadside unit when it is judged that there exists an abnormality based on the acquired information and the vehicle is not within a network coverage range.

20. The non-transitory computer-readable storage medium of claim 18, wherein the vehicle is a header vehicle in a vehicle fleet, and the method further comprises:

collecting information of follower vehicles in the fleet, and transmitting the acquired information as information of the vehicle itself together with the collected information of the follower vehicles.

* * * * *